(12) United States Patent
Sathaye et al.

(10) Patent No.: US 12,517,756 B2
(45) Date of Patent: Jan. 6, 2026

(54) LEARNING MODEL TO OPTIMIZE AUTOMATIC WORKLOAD MIGRATION

(71) Applicant: Dell Products, L.P., Round Rock, TX (US)

(72) Inventors: Sumedh Sathaye, Austin, TX (US); Kristen Walsh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 523 days.

(21) Appl. No.: 17/992,684

(22) Filed: Nov. 22, 2022

(65) Prior Publication Data

US 2024/0168796 A1    May 23, 2024

(51) Int. Cl.
*G06F 9/44* (2018.01)
*G06F 9/48* (2006.01)
*G06N 20/20* (2019.01)

(52) U.S. Cl.
CPC ........... *G06F 9/4875* (2013.01); *G06N 20/20* (2019.01)

(58) Field of Classification Search
CPC .................................................. G06F 9/4875
USPC ........................................................ 718/100
See application file for complete search history.

(56) References Cited

U.S. PATENT DOCUMENTS

| | | | |
|---|---|---|---|
| 2019/0235901 A1 | 8/2019 | Aiyar et al. | |
| 2020/0153896 A1* | 5/2020 | Kumar | G06F 9/5061 |
| 2020/0379805 A1 | 12/2020 | Porter et al. | |
| 2024/0028418 A1 | 1/2024 | Walsh et al. | |

OTHER PUBLICATIONS

Office Action mailed Jun. 17, 2025 for U.S. Appl. No. 17/868,716, 22 pages.

* cited by examiner

*Primary Examiner* — Timothy A Mudrick
(74) *Attorney, Agent, or Firm* — Amin, Turocy & Watson, LLP

(57) ABSTRACT

Metrics, including cost and latency, corresponding to a public computing system are monitored. A determination to migrate a workload running at donor computing system may be made based on the monitored metrics. A learning model, which may be initialized based on factors from a migration rules engine function, may make recommendations to migrate a workload based on a training data corpus. The learning model may be trained based on manual selections, or acceptances, of recommendations Automatic migration of a workload, under control of the learning model, may be made if recommendations are selected or accepted more frequently than an automatic migration criterion. Different learning models may be used to determine to migrate different corresponding workloads.

20 Claims, 15 Drawing Sheets

LEARNING MODEL TO OPTIMIZE AUTOMATIC WORKLOAD MIGRATION

BACKGROUND

The term 'cloud' may refer to a set, group, collection, or other plurality of computing resources, components, services, instances, collections, application, and the like that may be accessed by a computing resource, typically via a communication network (a communication network may also be referred to as a cloud). The term 'cloud' is typically used in reference to the computing resources without referencing specific items them make up the cloud resources when discussing computing functionality from the perspective of a computing resource that may make use of the functionality.

A cloud computing service provider may make available various computing resources, for example, software as a service, virtual machines, storage, bare metal computing hardware, or even a complete enterprise's infrastructure and development platforms, over a communication network. A cloud services provider may make a public cloud computing resource available to users over a publicly accessible network, such as the Internet. A private cloud computing resource is typically available or accessible only by a given customer, such as an enterprise and its employees. Computing resources may be provided from an enterprise's own on-premises data center or from a data center operated by an independent (e.g., independent from the enterprise customer) cloud services provider. A hybrid cloud may connect an organization's private cloud services and resources of public clouds into an infrastructure that facilitates the organization's applications and workloads in a manner that balances the maximizing of performance and the minimizing of costs across public and private cloud computing resources.

Cloud providers, whether providers of public or private computing resources, may use clustering of servers. A server cluster typically comprises servers that share a single Internet Protocol ("IP") address. Clustering enhances data protection typically, availability, load balancing, and scalability. A server associated with a cluster may be referred to as a node, which may comprise a hard drive, random access memory, ("RAM"), and central processing unit ("CPU") resources. In a hybrid cloud environment, it is desirable for an organization to use resources of its private cloud as much as possible and use public cloud computing resources to handle spikes in usage demands that would exceed a determined limit, or a capacity, of the organization's private network. Moreover, it is desirable for an organization to optimize (e.g., minimize) costs related to use of public cloud resources. An organization's private cloud computing system, or systems, may comprise active components, modules, storage, services, and other resources that facilitate computing needs of the enterprise. An organization's private cloud computing resources may also comprise idle, or inactive, components, modules, storage, services, and other resources that are essentially held in reserve but are not used until workload increases require additional resources than the active resources already being used and paid for by the enterprise. The enterprise may subscribe to the computing resources of their private network from a computing resources provider/cloud computing provider instead of maintaining the resources and owning them outright. A provider may increase a subscription fee when an enterprise activates idle/inactive resources. The subscription may include a warranty cost associated with given active computing resources, such as storage, a processing components or instances, network bandwidth, and the like. Typically, the more a resource has been used, the more 'wear' has been placed on it. Thus, an organization desires to find an optimal balance of use of private and public cloud resources to maximize performance and to facilitate supporting computing workloads of the organization while minimizing costs for computing resources and services whether public or private.

An organization may have multiple providers of public computing resources (e.g., multiple providers of public cloud computing resources) to choose from in handing its workloads for which it uses public cloud resources. Pricing from one public computing provider for a given service may be less that pricing for the same service from another provider, but the pricing between the two providers may change with the previously more costly provider becoming the lower cost provider. However, costs to switch providers, especially costs to transfer large volume of data from one provider to another is prohibitively high.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, an example method may comprise monitoring, via a communication network, such as the Internet, by a first computing system comprising a processor, at least one metric corresponding to at least one of a group of computing systems that are coupled with, and that provide computing services via, the communication network. The first computing system may comprise an organization's private network, which may be operated by the organization at its own data center or may be operated for the organization at a data center that is not operated by the organization. The at least one metric may comprise cost, latency, or other information related to use by the organization of the at least one of the group of computing systems, which group may comprise public computing systems that the organization may use, or be able to use, to operate workloads instead of operating the workloads on their private computing system. The method may comprise analyzing, by the first computing system, the at least one metric with respect to a determined migration criterion, and in response to the at least one metric being determined to satisfy the determined migration criterion based on a result of the analyzing, initiating, by the first computing system, a migrating of a computing workload from a second computing system of the group of computing systems to a third computing system of the group of computing systems.

The determined migration criterion may comprise a cost element, or factor; a latency element, or factor; an amount of time for the migration to occur after initiation; and the like. For example, the migration criterion may be used to determine to migrate the workload to a third computing system that has a lower cost to the organization for operating the workload than is currently being paid by the organization to a provider of the second computing system. However, in an aspect, the criteria could also seek to optimize operating of the workload by one of the group of computing systems according to cost as well as latency. In a scenario, a given computing system of the group of computing systems may provide a lower operating cost for handling the workload than the currently used second computing system but if a latency value of a monitored metric associated with the given computing system is significantly higher than a latency associated with the currently used second computing system the migration criterion, or criteria, may not be satisfied. In other words, in the example scenario, using the migration criterion, or criteria, a determination may be made that an increase in latency may not be worth the reduced cost to the organization that corresponds to the workload.

The example method may further comprise storing pre-migration state information corresponding to a state of the workload at the initiating of the migrating of the workload to a remote computing system storage, which may be remote from the first computing system, the second computing system, and the third computing system; and causing the reviving of the workload at the second computing system with the pre-migration state information. The pre-migration state information may correspond to a 'dirty state' that corresponds to a state of the workload at the time of the initiating. The 'dirty-state' pre-migration state information may include parameter values, coefficients, factors, connection information, metadata, user log-in information, and other data produced by, used by, stored by, or otherwise associated with the workload at the time of the initiating, but may not include a complete copy of the full workload (e.g., the pre-migration state information may not include application code for running a workload virtual machine). In other words, code to start a new workload may not be part of the pre-migrations state information stored to the remote computing system storage, but the pre-migration state information may include information that may be used to configure a new workload virtual machine that is started at the third computing system such that the new workload virtual machine is operating on the third computing system as the previous workload was operating on the second computing system at the time of the initiating of the migration.

The computing workload may comprise a computing instance, which may comprise a virtual machine. The computing workload may comprise an application. The computing workload may be configured to access, and perform operations on, data that is stored by a storage of a fourth computing system that is coupled with the communication network, wherein the fourth computing system comprises the remote computing storage on which the pre-migration state information is stored. For example, the remote computing storage may comprise a storage located geographically close to a location of one or more of the group of computing systems that facilitates storage of data of the organization such that the data need not be migrated with the migration of a workload from one public computing system to another.

The determined migration criterion may be determined according to rules and/or factors. An individual user, such as an employee of the organization, may determine the rules or factors. For example, the rules or factors may be determined to always minimize cost to operate a workload. In another example, the rules or factors may be determined to minimize costs to operate the workload as long as latency in a computing system that a workload is migrated to, such as the third computing system, does not exceed a limit. An artificial intelligence algorithm may determine the criterion, or criteria, based on analyzing past migration activity when cost or latency metrics were considered and based on cost savings or latency changes achieved based on the past analyzing.

The rules and factors may be determined based on user input received by the first computing system, wherein the user input comprises information corresponding to the rules and factors entered or provided via an interface coupled with the first computing system.

The method may further comprise determining, by the first computing system, the rules and factors based on a log of migration operations performed by the first computing system before the analyzing of the at least one metric with respect to the determined migration criterion. An artificial intelligence model algorithm may have been trained using log, or history, information corresponding to previous migration activities, which may include having determined not to perform a migration if monitored metrics did not satisfy a migration criterion, or migration criteria. Thus, the artificial intelligence model algorithm may be trained not only on migration activities that were performed in the past along with corresponding past actual cost or latency improvements or degradations, but the artificial intelligence model algorithm may also be trained on past actual cost or latency improvements or degradations that occurred after monitored metrics were analyzed but a determination was made not to migrate a workload from a public computing system currently being used to another public computing system.

The at least one metric may comprise a spot market cost factor applicable to operation of the computing resource on the second computing system. A spot market may comprise an online, or electronic, platform operated for sellers that may currently use, or that may have purchased the right to use, computing resources of one or more public computing system providers—the sellers may effectively become resellers of public computing resources. Instead of using the computing system resources that have been purchased, the sellers may choose to sell the resources. The spot market may be in the form of an auction available to, or may be in the form of a direct offer from a seller to, an organization's private computing system, or a module that monitors metrics or that determines to migrate a workload. The module may monitor cost or latency metrics from a seller/reseller via the Internet and may automatically determine to migrate a workload based on analyzing of the monitored metrics from the spot market being analyzed according to the migration criterion/criteria.

The first computing system may output, via a user interface of the first computing system, an alert that the at least one metric has been determined to satisfy the determined migration criterion. An alert may be intended to notify personnel of the organization that a determination has been made by a module that has analyzed monitored metric data according to migration criterion/criteria. An alert may comprise a query that requests an approval input from an organization's personnel via a user interface that the migration may proceed, or the alert may merely inform an organization, personnel thereof, or just a module of a private computing system of an organization, that a determination has been made to migrate a workload.

In an example embodiment, an example system may comprise a first computing system, coupled to a communication network, that may comprise a processor configured to monitor, via the communication network, at least one metric corresponding to at least one computing system of computing systems that are coupled to, and that enable computing services via, the communication network. The computing systems of which the one computing system is a member, may comprise a public computing system to which an organization may migrate a workload. The processor may be configured to analyze the at least one metric with respect to a determined migration criterion; and in response to the at least one metric being determined to satisfy the determined migration criterion based on a result of the analyzing, initiate migration of a computing workload from a second computing system of the computing systems to a third computing system of the computing systems.

The processor may be further configured to store pre-migration state information corresponding to a state of the workload at the initiating of the migrating of the workload to a remote computing system storage that is remote from the first computing system, the second computing system, and the third computing system; and to cause the reviving of the workload at the second computing system with the pre-migration state information. The causing of the reviving of the workload may comprise sending a message to the remote computing system storage with an instruction to forward, or to permit the retrieval of, the pre-migration information to the third computing system to which the workload is being migrated. The pre-migration state information may comprise dirty state values that can be used to configure a new virtual machine at the third computing system or the pre-migration state information may comprise a full image of the workload before, or at the time of, the initiating of the migration of the workload.

The workload may be configured to access, and perform operations on, an enterprises data, which may be referred to as operational data or enterprise data, that is stored by a storage of a fourth computing system that is communicatively coupled with the communication network, and wherein the fourth computing system comprises the remote computing storage on which the pre-migration state information is stored. The enterprise's operational data that may be stored by the storage of the fourth computing system may comprise data that is not the pre-migration data. The enterprise's operational data may comprise databases, video content files, image content files, text content files, and other types of data. The enterprise's operational data may correspond to amounts or sizes of data such that if the operational data had to be migrated with a workload, such migration of the workload would likely not be cost beneficial to the organization corresponds to the workload if a cost associated with transferring the enterprise's operational data from a current computing system on which the workload is currently operating to a computing system to which the workload is to be migrated would exceed cost saving that might otherwise be realized by migrating the workload. Thus, the pre-migration state information may be stored to the same storage on which operational data that the workload uses is stored.

The determined migration criterion may be determined according to rules and factors. The processor may be further configured to present a user interface to receive one or more inputs from a user to determine the rules and factors or to enter the migration criterion or migration criteria. The processor may be further configured to determine the rules and factors based on a log of migration operations performed by the first computing system before the analyzing of the metric with respect to the determined migration criterion.

In an example embodiment, a non-transitory machine-readable medium may comprise executable instructions that, when executed by a processor of a computing device coupled with a communication network, facilitate performance of operations, comprising: monitor, via the communication network, at least one metric corresponding to at least one of a set of computing systems that are coupled with the communication network; analyze the at least one metric with respect to a determined migration criterion; and in response to the at least one metric being determined to satisfy the determined migration criterion based on a result of the analyzing, initiate migration of a computing workload from a second computing system of the set of computing systems to a third computing system of the set of computing systems.

The processor may be further configured to store pre-migration state information corresponding to a state of the workload at the initiating of the migrating of the workload to a remote computing system storage that is remote from the first computing system, the second computing system, and the third computing system; and cause the reviving of the workload at the second computing system with the pre-migration state information.

The workload may be configured to access, and perform operations on, data, such as an enterprise's operational data, that is stored by a storage of a fourth computing system that is coupled with the communication network and that may be geographically located within a defined distance of the second computing system, and wherein the fourth computing system may comprise the remote computing storage on which the pre-migration state information is stored. The pre-migration state information may comprise an image of the workload. The pre-migration state information may comprise state information corresponding to the workload at the initiating of the migration of the workload but not an image of the full workload at the initiating of the migration.

In another example embodiment, a method may comprise monitoring, via a communication network, by a first computing system comprising a processor, a first metric corresponding to a second computing system of a set of computing systems that are available to provide computing services via the communication network; analyzing, by the first computing system, under control of a first trained learning model, the first metric with respect to a first metric migration criterion, the analyzing resulting in an analyzed first metric. The method may further comprise generating, by the first computing system, under control of the first trained learning model, first migration data representative of a first migration determination to migrate a first workload from the second computing system to a third computing system of the set of computing systems based on the analyzed first metric indicating that the first metric satisfied the first metric migration criterion. The first migration data may be used to generate a recommendation to migrate, or to not migrate, the first workload. The method may comprise, responsive to the first migration determination, causing, by the first computing system, migration of the first workload from the second computing system to the third computing system.

The example method may further comprise monitoring, via the communication network, a second metric corresponding to the third computing system of the set of computing systems, wherein the first metric migration criterion is evaluated based at least in part on the second metric. The first metric may comprise a cost or a performance metric corresponding to operation of the first workload on the second computing system or based on potential operation of the first workload on the third computing system. The second metric may comprise a cost or a performance metric corresponding to potential operation of the first workload on the third computing system. Evaluation of the first metric migration criterion may determine to migrate the first workload to the third computing system based on the third computing systems resulting in a lower cost to operate the workload that a cost to operate the workload on the second computing system.

The example method may comprise training of the first trained learning model via acts comprising generating migration recommendation data representative of migration recommendations of whether to migrate one or more training computing workloads. Responsive to the migration recommendations, the training may further comprise receiving migration selection data representative of respective migration selections (e.g., acceptance or rejection of the recommendations) corresponding to the migration recommendations; and updating an initial version of the learning model based on the respective migration selections and migration recommendations to which the respective migration selections correspond, the updating resulting in the first trained learning model.

At least one of the migration selections may comprise an instruction to migrate at least one of the one or more training computing workloads (e.g., an acceptance of a recommendation to migrate or a rejection of a recommendation to not migrate). The training of the first trained learning model may further comprise analyzing a first migration selection of the migration selections with respect to a first migration recommendation of the migration recommendations according to a migration recommendation acceptance function (e.g., a function comprising a cost variable or a performance variable), the analyzing of the first migration selection resulting in a first determined migration recommendation acceptance; analyzing a second migration selection of the migration selections with respect to a second migration recommendation of the migration recommendations according to the migration recommendation acceptance function, the analyzing of the second migration selection resulting in a second determined migration recommendation acceptance; and updating the first metric migration criterion based on the first determined migration recommendation acceptance or the second determined migration recommendation acceptance.

In an embodiment, at least one of the first determined migration recommendation acceptance or the second determined migration recommendation acceptance is manually input, or configured. In another embodiment, at least one of the first determined migration recommendation acceptance or the second determined migration recommendation acceptance may be automatically determined based on a migration criterion of a rules engine.

In an embodiment, at least one of the migration selections may comprise an instruction for at least one workload, of the one or more training computing workloads, to remain on a computing system via which the at least one workload is currently executing. The training of the first trained learning model may further comprise analyzing a first migration selection of the migration selections according to a migration recommendation acceptance function with respect to a first migration recommendation of the migration recommendations corresponding to the first migration selection, the analyzing of the first migration selection resulting in a first determined migration recommendation acceptance; analyzing a second migration selection of the migration selections according to a migration recommendation acceptance function with respect to a second migration recommendation of the migration recommendations corresponding to the second migration selection, the analyzing of the second migration selection resulting in a second determined migration recommendation acceptance; and updating the first metric migration criterion based on at least one of the first determined migration recommendation acceptance or the second determined migration recommendation acceptance. In other words, a recommendation may be made by the embodiment method and criteria used by the embodiment method to determine to migrate other workloads may be updated based on acceptances or rejections of recommendations made according to the embodiment method. In an embodiment the initial learning model is configured with factors of a static migration rules engine.

In an embodiment of the example method, respective migration selections (e.g., acceptances or rejections or recommendations) corresponding to the migration recommendations may manually input to the initial learning model or to the first trained learning model via a user interface.

The first workload, when executing via the second computing system, may comprises instructions to access data from a data store corresponding to a fourth computing system communicatively coupled with the communication network, and wherein the first migration data representative of the first migration determination comprises instructions for the first workload to access the data from the data store after the first workload has been migrated to the third computing system.

In an embodiment the first trained learning model may correspond to a first type of learning model for an instance of the first workload being a first type of workload, and the first trained learning model may correspond to a second type of learning model for the instance of the first workload being a second type of workload. In other words, different learning models, or different learning model types may be used to recommend migration of different workloads, or different types of workloads.

The example embodiment method may further comprise monitoring, via the communication network, by the first computing system, a second metric corresponding to a fourth computing system of the set of computing systems; analyzing, under control of a second trained learning model executing via the first computing system, the second metric with respect to a second metric migration criterion, the analyzing of the second metric resulting in an analyzed second metric; generating, under control of the second trained learning model, second migration data representative of a second migration determination to migrate a second workload executing via the fourth computing system to a fifth computing system of the set of computing systems based on the analyzed second metric satisfying the second metric migration criterion; and responsive to the second migration determination, causing, by the first computing system, migration of the second workload from the fifth computing system to the sixth computing system, wherein the first trained learning model and the second trained learning model are different. The first metric and the second metric, and corresponding first and second respective migration criteria may be the same type of metric, for example a cost metric or a performance metric, but may comprise different values because the metrics correspond to different workloads.

In another embodiment system example, a first computing system may comprise a first processor configured to: monitor, via a communication network, a first workload metric corresponding to a first workload running on a second computing system of a group of computing systems that are available to provide computing services via the communication network and via service provider interfaces. The first computing system may be configured to analyze, with a first trained learning model the first workload metric with respect to a first workload metric migration criterion to result in an analyzed first workload metric; generate, with the first trained learning model, a migration determination to migrate the first workload from the second computing system of the group of computing systems to a third computing system of the group of computing systems based on the analyzed first workload metric satisfying the first workload metric migration criterion, such as a cost or a performance criterion; and responsive to the migration determination, causing, by the first computing system, migration of the first workload from the second computing system to the third computing system.

The first workload, when running on the second computing system, may comprise instructions to access data from a data store corresponding to a fourth computing system communicatively coupled with the communication network, and wherein the migration determination comprises instructions for the first workload to access the data from the data store after the first workload has been migrated to the third computing system.

The embodiment system may further comprise a fourth computing system that comprises a second processor, wherein the second processor is configured to: monitor one or more workload metrics corresponding to one or more training computing workloads running on one or more of the group of computing systems that are available to provide computing services via the communication network to result in one or more monitored workload metrics; based on the one or more monitored workload metrics, generate one or more migration recommendations, corresponding to the one or more training computing workloads and comprising one or more migration recommendations corresponding to the one or more training computing workloads; responsive to the one or more migration recommendations, receive respective one or more migration selections corresponding to the one or more migration recommendations; and update an initial learning model based on the respective one or more migration selections and the one or more migration recommendations to result in the first trained learning model. The one or more migration selections may be manually input from a user or automatically determined, or generated based on the first trained learning model, based on a different learning model, or based on a static criteria configuration of the first computing system.

In an embodiment, the first computing system and the fourth computing system are different computing systems.

At least one of the one or more migration selections may comprise an instruction to migrate a workload, of the one or more training computing workloads, corresponding to the at least one of the one or more migration selections, wherein the training of the first trained learning model further comprises: analyzing a first migration selection of the one or more migration selections with respect to a first migration recommendation of the one or more migration recommendations according to a migration recommendation acceptance function to result in a first determined migration recommendation acceptance; analyzing a second migration selection of the one or more migration selections with respect to a second migration recommendation the one or more migration recommendations according to the migration recommendation acceptance function to result in a second determined migration recommendation acceptance; and updating the first workload metric migration criterion based on the first determined migration recommendation acceptance or the second determined migration recommendation acceptance.

A non-transitory machine-readable medium embodiment may comprise executable instructions that, when executed by a processor associated with a first computing system, facilitate performance of operations that may comprise monitoring, via a communication network, a first workload metric corresponding to a first portion of a first workload executing on a second computing system of computing systems that are coupled with, and that provide computing services via, the communication network, for example via service provider interfaces. The operations may further comprise monitoring, via the communication network, a second workload metric corresponding to a second portion of a second workload executing on a third computing system of the computing systems; analyzing, using a first trained learning model, the first workload metric with respect to the second workload metric to result in a comparative workload metric indicating that migration of the first portion of the first workload to the third computing system is likely to result in a defined benefit with respect to continuing to execute the first portion of a first workload on the second computing system. An example benefit may be a reduction in cost or an increase in performance of the workload. In operation may further comprise generating, using the first trained learning model, a migration determination to migrate the first portion of the first workload from the second computing system of the computing systems to the third computing system of the computing systems based on the comparative workload metric being determined to satisfy a comparative workload metric criterion (e.g., migration would result in a lower cost or an improved performance of the workload). The operations may further comprise, responsive to the migration determination, initiating, by the first computing system, the migration of the first portion of the first workload from the second computing system to the third computing system.

In an embodiment, the operations may further comprise generating migration recommendations that recommend migration of training computing workload portions; responsive to the migration recommendations, receiving respective migration selections corresponding to the migration recommendations; updating an initial learning model based on the respective migration selections and the migration recommendations to which the respective migration selections to result in the first trained learning model, wherein at least one of the migration selections comprises a first instruction for the second portion of the second workload, of the training computing workload portions, corresponding to the at least one of the migration selections to remain on a computing system on which the second workload portion is currently executing, wherein at least another one of the migration selections, other than the at least one of the migration selections, comprises a second instruction to migrate a third portion of a third workload, of the training computing workload portions, from a computing system on which the third workload portion is currently executing. The embodiment instructions may further comprise analyzing a first migration selection of the migration selections according to a migration recommendation acceptance function with respect to a first migration recommendation corresponding to the first migration selection to result in a first determined migration recommendation acceptance; analyzing a second migration selection of the migration selections according to a migration recommendation acceptance function with respect to a second migration recommendation corresponding to the second migration selection to result in a second determined migration recommendation acceptance; and updating the comparative workload metric criterion based on at least the first determined migration recommendation acceptance or the second determined migration recommendation acceptance. A workload portion may comprise a virtual machine, a database, an instruction, a service, a container, or other computing service, entity, or process.

The first workload metric or the second workload metric may correspond to at least one of: a disruption tolerance, a first cost of the first portion of the first workload executing on the second computing system, a second cost of the first portion of the first workload executing on the third computing system, a third cost of the first portion of the first workload per unit of time on premises, a percentage of time at peak, a virtual disk storage cost associated with the second computing system, a virtual disk storage cost associated with the third computing system, a fourth cost of a first virtual machine associated with the second computing system at a first point in time, a fifth cost of a second virtual machine associated with the third computing system at a second point in time, a sixth cost of a third virtual machine per storage unit of a virtual storage associated with the second computing system, a seventh cost of a fourth virtual machine per storage unit of a virtual storage associated with the third computing system, an eighth cost of a fifth virtual machine per storage unit of a virtual storage associated with the second computing system at a third point in time, a ninth cost of a sixth virtual machine per storage unit of a virtual storage associated with the third computing system at a fourth point in time, a tenth cost of bandwidth to migrate the first portion of the first workload from the second computing system to the third computing system, an eleventh cost to migrate the first portion of the first workload from the second computing system to the third computing system, a first workload mode of steady, or a second workload mode of variable.

The first portion of the first workload, when executing on the second computing system, may comprise first instructions to access data from a storage communicatively coupled with the communication network. The migration determination may comprise second instructions for the first portion of the first workload to access the data from the storage communicatively coupled with the communication network after the first portion of the first workload has been migrated to the third computing system.

DETAILED DESCRIPTION OF THE DRAWINGS

Figure 1:
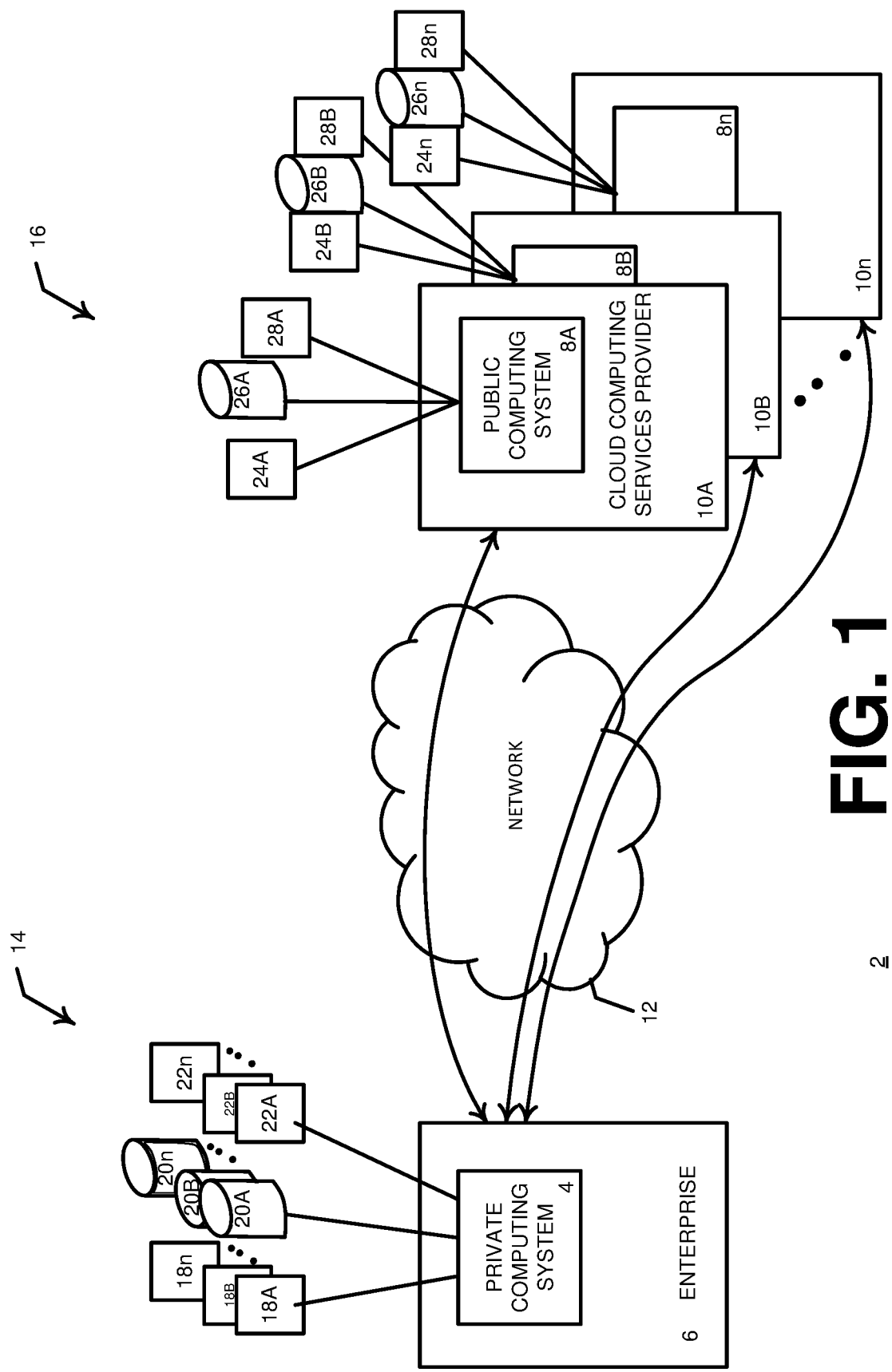
FIG. 1 illustrates an example hybrid computing system with a plurality of public computing systems.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

A monitor service may monitor components, resources, or workloads in a hybrid computing system environment. The monitor service can run on a SmartNIC or iDRAC or iSM or VxRail Manager or OpenBMC or any such controller of the computing system. The monitoring service may be one of multiple monitoring service with some of the services acting as clients of a master of the monitoring services, which master may act as a main interface for the others with respect to the computing system, such as may be used in a computing environment that comprises clusters.

Turning now to the figures, FIG. 1 illustrates computing system 2, which may comprise a hybrid computing system. System 2 may comprise private computing system 4 operated by an enterprise 6, which may be a business, a learning institution, a government agency, and the like. Private computing system 4 may have communication capability with one or more public computing systems 8A-8n, which may be operated by corresponding cloud computing services providers 10A-10n, via communication network 12, which may comprise the Internet. Private computing system 4 may comprise a plurality of computing resources, for example processing resources 18A-18n, storage resources 20A-20n, and software resources 22A-22n. Private computing system 4 may comprise other resources than processing, storage, and software, which are shown only for purposes of illustration and discussion. Public computing systems 8A-8n may comprise a plurality of computing resources, for example processing resources 24A-24nl, storage resources 26A-26n, and software resources 28A-28n. Public computing systems 8A+8n may comprise other resources than processing, storage, and software, which are shown only for purposes of illustration and discussion.

Figure 2A:
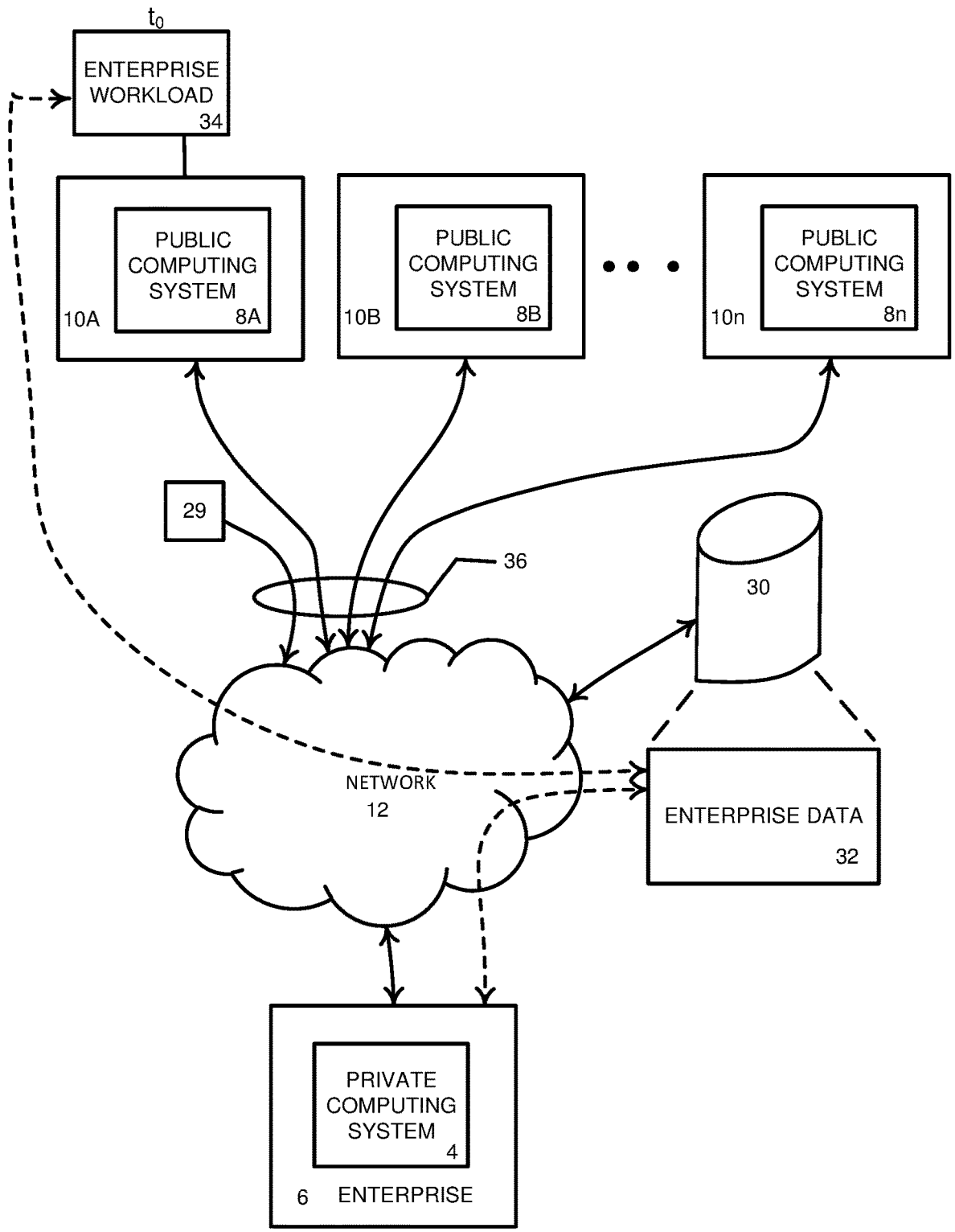
FIG. 2A illustrates an example hybrid computing system showing a workload at the beginning of migration from a public computing system to a different public computing system.

Turning now to FIG. 2A, the figure illustrates system 2 with monitor 36, which monitors usage parameters corresponding to public computing system resources 8A-8n of public computing service providers 10A-10n. The monitored parameters may comprise pricing for one or more different computing resources of computing systems 8A-8n of providers 10A-10n. The pricing information may be received via communication network 12. In addition to receiving pricing information for various computing services from service providers 10A-10n, pricing for services offered by providers 10A-10n may be received via communication network 12 from resellers, or from one or more spot market providers 29 that facilitate a market, including online, Internet or other electronic market type, for buying and selling public computing resources that have already been sold by providers 10A-10n. Monitor 36 may comprise one or more computing services. In an embodiment, monitor 36 may comprise a service running on private computing system 4. Monitor 36 may comprise a service running on a third computing system coupled with communication network 12 that is not private computing system 4 or one of public computing systems 8A-8n, or the monitor may comprise a service running on one of public computing systems 8A-8n.

Storage 30 may comprise storage resources, such as disc drives, solid state drives, tape drives, and the like, that are provided by a storage resources provider that is not one or public computing resource providers 10A-10n. Storage 30 may be collocated at a computing data center that is operated for one of public computing resource providers 10A-10n. Storage 30 may be located at a computing data center that is not operated by one of public computing resource providers 10A-10n, but that is located geographically close to a data center operated by one of providers 10A-10n. Storage 30 may facilitate an enterprise storing its enterprise information and operational data 32 separate from computing resources provided by public computing resource providers 10A-10n. If enterprise 6, or the enterprise's computing system 4, determines to change from one of providers 10A-10n to another of providers 10A-10n for the providing of computing resources that augment private computing system 4, data 32 does not have to be transferred from the one public computing resources provider to the other.

Data egress may refer to moving, or transferring, data from one storage to another, including from a storage of one public computing resources provider to another public computing resources provider. Data egress costs from public cloud computing systems are usually high, not only in terms of time to reserve space at a target storage but also in terms of the actual time to transfer data from one storage to another, as well as in terms of bandwidth resources of a communication network used to transfer the data. The cost associated with moving data from one storage to another when a user, such as enterprise 6, switches providers from one public computing resources provider to another may be prohibitively high insofar as any cost saving an organization my otherwise realize by changing public computing resources providers because differences in computing services pricing may be overwhelmed by data transfer, or data egress, costs. Thus, an organization may keep its data with the public computing provider even though the organization may be able to obtain better pricing with another provider. By an organization, such as enterprise 6, storing its data 32 at third-party storage facility 30 (the storage is operated by a 'third-party' in the sense that storage 30 is not part of public computing systems 8A-8n) the organization may change providers of computing resources dynamically, or almost 'on-the-fly', because data 32 stays at storage 30 and thus data egress costs are reduced, if not eliminated.

FIG. 2A shows workload 34 of enterprise 6 being currently (e.g., at time to seconds) serviced by resources of public computing system 8A provided by provider 10A. The term 'workload' may refer to a computing application, service, instance, capability, or work that consumes computing resources (e.g., processing, memory, network access, or storage). Databases, tables, containers, microservices, VMs, and the like may be referred to as workloads. Workloads may comprise mobility solutions, office productivity applications, video conferencing solutions, disaster recovery solutions, analytics, or web content/hosting. Workload 34 is rendered in FIG. 2A in solid lines to show that the workload is currently being serviced by computing system 8A. Workload 34 may be facilitated by containerized services, instances, applications, and the like that may be migrated, partially or fully, from one or more virtual machines ("VM") running on computing system 8A to one or more VMs running on any other system, or systems, 8B-8n.

Figure 2B:
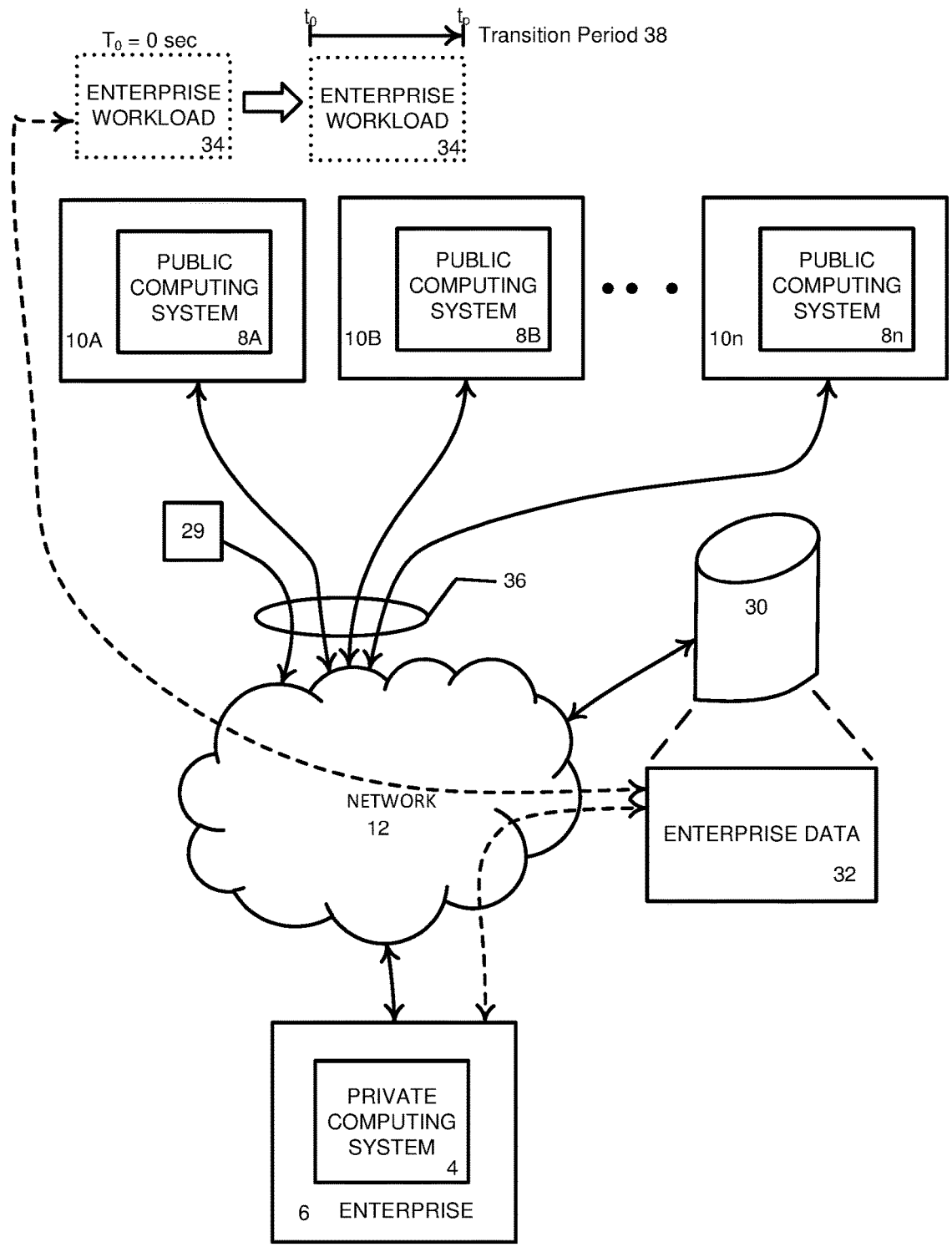
FIG. 2B illustrates an example hybrid computing system showing a workload during migration from a public computing system to a different public computing system.

Turning now to FIG. 2B, workload 34 is shown in broken lines at to and again in broken lines between to and a time after to that is to plus a transition period t p 38. The phrase 'migration period' may be used to refer to transition period 38. Workload 34 is shown unattached to a computing system 8A-8n in FIG. 2B. The transition, or migration, of workload 34 from computing system 8A may have been determined to proceed because of computing system 4 electronically receiving pricing information corresponding to one or more of computing systems 8B-8n from monitor 36 that indicates transitioning the workload away from computing system 8A to another computing system 8B-8n would be advantageous for cost or for performance reasons.

Figure 2C:
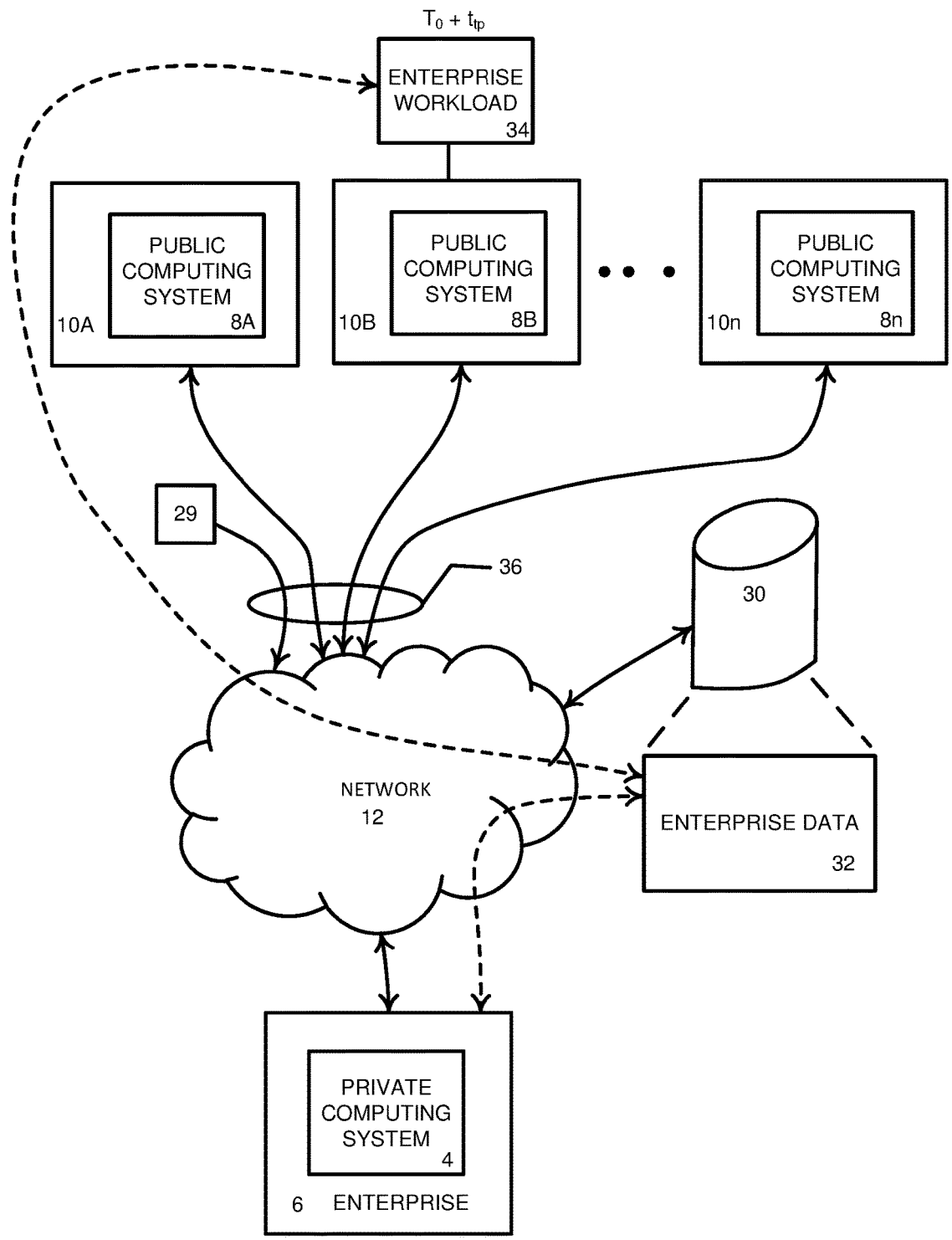
FIG. 2C illustrates an example hybrid computing system showing a workload after migration from a public computing system to a different public computing system.

FIG. 2C illustrates system 2 with workload 34 being rendered in solid lines and centered over, and connected to, provider 10B and thus to its corresponding public computing system 8B at time $t_0+t_p$. to indicate that the workload has been transitioned to use computing system resources from public computing system 8B. Data 32 has not transitioned, or migrated, from storage 30. Rather, data 32 remains at storage 30 and 'follows' workload 34 without moving from storage 30 as the workload migrates from donor computing system 8A to recipient computing system 8B as shown by the broken line connecting enterprise data block 32 and enterprise workload 34 at the workload's new, or recipient, public computing system 8B.

It will be appreciated that during transition period 38, which may be a few minutes, a few seconds, or less than one second, workload 34 may not be serviced by computing resources of either computing system 8A or of computing system 8B. For transitioned workload 34 to resume operating on resources provided by computing system 8B, a pre-transition state, or pre-migration state, of the workload at time to that may comprise settings, parameter values, instruction pointers, one or more steps of an application of the workload being executed, and the like, that existed before the transition from one computing system to the other began may be stored and transferred to new computing system 8B so that the transitioned workload can 'pick up where it left off.' The terms 'pre-migration' and 'pre-transition' may be used interchangeably, and the terms 'migration' and 'transition' may be used interchangeably.

Figure 3A:
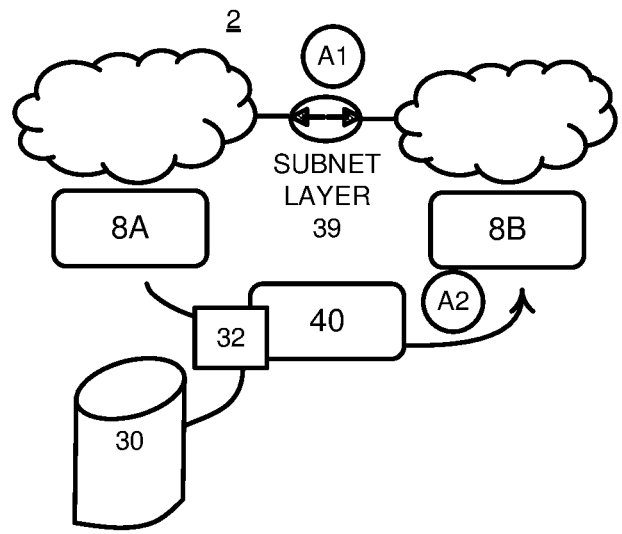
FIG. 3A illustrates an example embodiment system to migrate a full workload from a public computing system to a different public computing system.

Turning now to FIG. 3, the figure illustrates donor computing system 8A and recipient computing system 8B arranged for a full VM transfer. At step A1 subnet layer 39 connection between computing systems 8A and 8B may be established to facilitate transfer of one or more VMs 40 corresponding to enterprise 6 shown in previous figures from the current donor computing system 8A to the target recipient computing system 8B. After subnet layer connection 39 is established, VMs, which may include application code, may be transferred at step A2 via the subnet layer from computing system 8A to computing system 8B. It will be appreciated that after a transfer begins, the one or more VMs 40 being transferred may not be serviced by a computing system and thus may be viewed as 'dormant'.

Figure 3B:
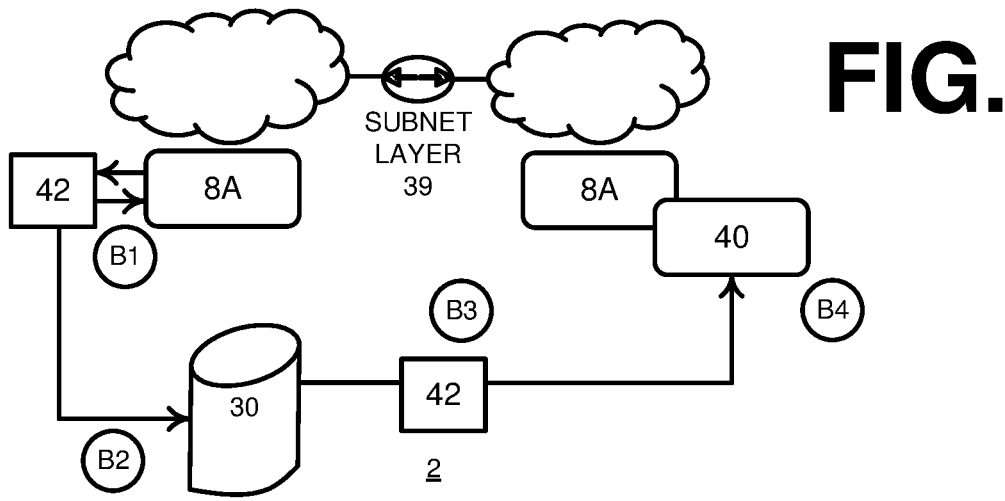
FIG. 3B illustrates an example embodiment system to perform a dirty state migration of a workload from a public computing system to a different public computing system.

In FIG. 3B, at step B1 one or more pre-transition, or pre-migration, VM information state, or states, 42 corresponding to one or more VMs that were running on computing system 8A at time to is/are stored to storage 30 at step B2. A VM 40 may comprise a shell of a VM as well as a shell of an application that will need to be revived at target/donor computing system 8B using information of the pre-transitions state 42, corresponding to time to, that is saved to storage 30.

Pre-transition state information 42 is transferred to computing system 8B from storage 30 at step B3 and one or more shell applications of VMs 40 are revived using the pre-transition state information 42 at step B4, which may occur at or about time $t_0+t_p$. Pre-transition state information 42 may be referred to as 'dirty-state' information to indicate that although state information 42 was current as of time to circumstances may change during t p, for example, data from sensors being monitored by a VM 40 at to, may change during t p. When a VM 40 is revived at step B4 using state information 42 stored at step B2, VM will be revived to the state it was in at time to when it was actively operating on donor computing system 8A.

Figure 3C:
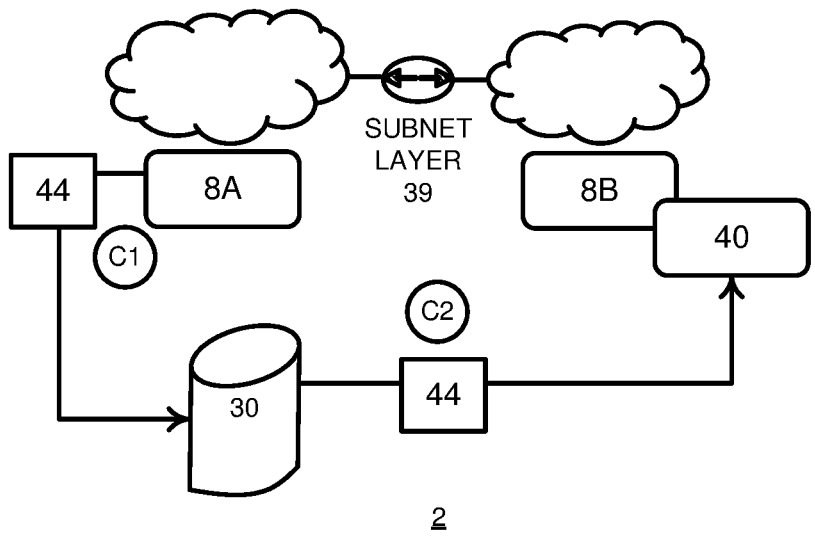
FIG. 3C illustrates an example embodiment system to perform an image migration of a workload from a public computing system to a different public computing system.

In FIG. 3C, pre-transition application image 44 corresponding to the state of a workload to be transferred at time to is moved from a VM 40 running on donor computing system 8A at $t_0$ to storage 30 at step C1 and then at step C2 from storage 30 to the VM 40 at recipient computing system 8B. Instead of just storing pre-transition state information 42 to storage 30, a snapshot of a full VM, including an application, may be stored to storage 30 before beginning a transition of one or more VMs from computing system 8A to computing system 8B. After a new VM at recipient computing system 8B has been started its state that was current at time to may be revived using pre-transition application state information 44, which may comprise an image, or snapshot, of an application running on computing system 8A at to that is to be revived at recipient computing system 8B. A revived VM 40 running on computing system 8B may need to gather information to update itself to be current as of $t_0+t_p$. To facilitate moving application state information 44 of a full VM, application code may be written to facilitate moving only a minimum of modules of the application that are needed for the application to start in the VM 40 at computing system 8B. Thus, an application may be written so that application image 44 may use an amount of memory that only transfers essential information and data to facilitate the application being transferred to and run at donor computing system 8B and so that connections and scripts are updated in the donor computing system 8B. Such minimal, or 'skinny' code may optimize latency and cost in storing application image 44 to storage 30 and then to donor computing system 8B.

Figure 4:
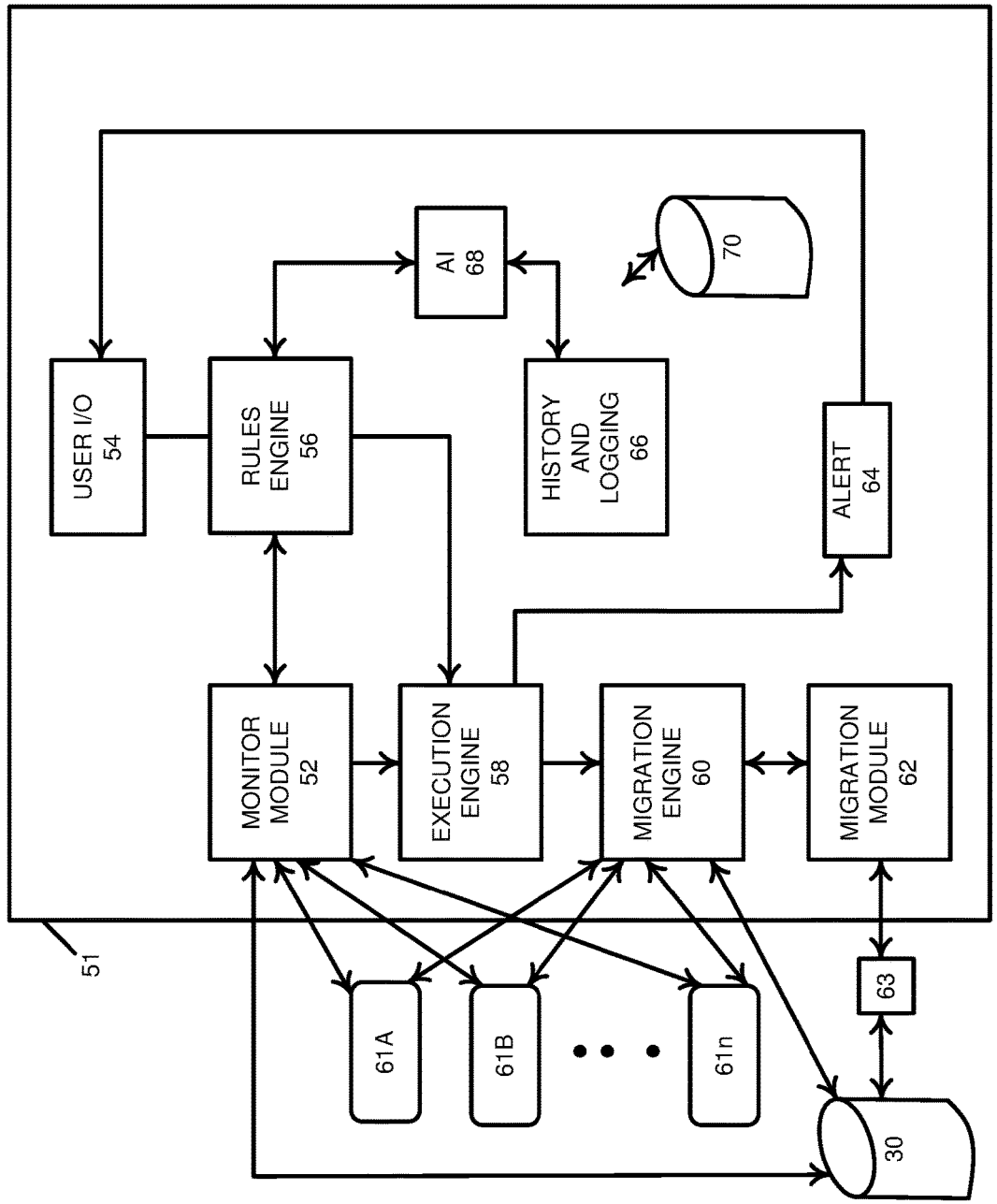
FIG. 4 illustrates an embodiment system having a module to facilitate migration of a workload from a public computing system to a different public computing system.

Turning now to FIG. 4, the figure illustrates a system 50, which may comprise a software module 51 that further comprises other software modules that may interface with external public or private clouds/computing systems. Module 51 may comprise service provider interfaces modules 61A-61n that correspond to public computing resource service providers 10A-10n as described in reference to other figures herein.

Module 51 may comprise monitor module 52. Monitor module 52 may comprise monitor 36 as shown in other figures herein, or may receive information from monitor 36 such as, for example, cost information related to computing resource providers 10A-10n. Monitoring module 52 may comprise a service that keeps track of a cost of holding and executing computational assets in the clouds of providers 10A-10n, and consuming cloud-based services. Monitoring module 52 may operate under control of policy rules engine 56, which may specify which assets and services to track (e.g., resources of cloud services providers 10A-10n), how often to monitor or sample, how to compute costs per application, user, or time, etc., and how or when to report monitored information.

Module 51 may include a user interface 54, which may provide a dashboard for a user, such as an employee of enterprise 6, as shown in FIG. 1, to use in evaluating, monitoring, establishing criteria, or reviewing of information relative to costs providers of public computing resources 10A-10n. a user may use user interface 54 to enter criteria that may be used to determine when to transition a workload from one public computing resources provider to another. The criteria may be forwarded to a rules engine module 56, which may apply the criteria, or other rules, to cost information received from monitor module 52. For example, a cost value corresponding to a public computing resources provider may be received by rules engine 56 from monitor module 52 and may cause rules engine 56 to change, or adapt, automatically, a criteria that a user may have entered using user interface module 54.

Rules engine module 56 may be programmed by the Financial Operations ("FinOps") user of an enterprise using a policy spec language or other user interfaces via user interface module 54. Development Operations ("DevOps") users of an enterprise may specify restrictions on policies, based on an application's requirements. Rules engine module 56 may consider constraints, or criteria, and may create directives for the monitoring and reporting of cost information by a monitoring service facilitated by monitoring module 52. If the monitoring leads to determining threshold events that trigger actions, the set of actions may be directed by the rules engine module 56 to be performed by Policy/Action Execution Engine 58. The set of actions directed by rules engine 56 may comprise 'recipes', or programs, that execution engine 58 executes, under supervision and control of the rules engine 56.

Rules engine 56 may forward criteria, or other rules, that have been determined based on information received from user interface 54 or based on information received from module 52 to the execution engine module 58. Execution engine 58 may apply rules received from rules engine module 56 to cost information received from monitor module 52 and determine that a workload currently operating on a given public computing system should be migrated, partially or fully, to a different public computing system. Execution engine module 58 may forward a determination that a workload should be migrated, or transferred, from one public computing system to a different public computing system to migration engine module 60 to effectuate the migration, or transfer. Actions associated with workload asset and service migration from one public cloud to another, or to a private cloud, may be executed by execution engine module 58. Rules engine 56 may provide actions to be executed by execution engine 58 at run-time, or may be policies that were defined to rules engine 56 before the monitoring by a monitoring service facilitated by monitoring module 52 begins. Actions to be executed by execution engine 58 may change with time, or with external events, for example a cloud outage/computing system outage of one of service providers 10A-10n.

Migration engine module 60 may cause a snapshot of the workload or a current state of a VM running on the donor public computing system to be stored to storage 30. Migration module 62 may manage establishing a subnet layer between the donor computing system and the recipient computing system for the workload to be transferred it may retrieve the workload snapshot and state information from storage 30. Migration engine module 60 may combine and execute a logical program order for migration of cloud assets and services. Migration module 60 may also be involved in mapping the migration program parts into specific methods of migration/transfer of a workload, for example, a full VM transfer as described in reference to FIG. 3A, a dirty state transfer as described in reference to FIG. 3B, or an application state transfer as described in reference to FIG. 3C.

Migration module 62 may forward the VM state information and application snapshot information to the donor public computing system. Storage control module 63 may provide an interface with a public cloud-adjacent storage service, such as storage 30, such that migration module 62 interacts with module 63 without having to interface directly with storage 30. Similarly, other services can also be implemented, or 'abstracted,' using service-specific interfaces. Migration module 63 may map specific cloud actions (e.g., actions that are specific to, or customized with respect to, a given service provider's 10A-10n corresponding public computing system 8A-8n) to the respective cloud modules 61A-61n, and keep tracks of the migration control plane state, thus facilitating an atomic migration action for workload assets and services specified by rules engine 56. Atomicity facilitates completion of a migration/transition for a given computing system 8A-8n, or a return to the pre-migration/pre-transition state, but typically not partial execution of a migration/transition of a workload.

Alerting module 64 may manage an alerting function of system 50. Alerting module 64 may generate an alert message or cause an indication, either visual, audio, textual, and the like, to be provided to user interface 54. Alert module 64 may cause an alert at user interface 54 such that a user of the interface is either aware that a transfer from a donor public computing system to a recipient computing system will automatically occur, has automatically occurred, or that a manual confirmation from the user is required to effectuate the transfer from the donor public computing system to the recipient public computing system. Thus, DevOps and FinOps personnel can receive alerts of critical and emergency actions, as well as alerts based on the individual alerts/notification preferences of the personnel.

History and logging module 66 may comprise functionality to capture a history of activity in system 50, for example in a time-series database. A time-stamp record consisting of uniform log messages may be managed by module 66. A log may be forwarded to an external control-plane system, another log-capture service (e.g., a SIEM), etc. Management of logging settings, logging preferences, logging expectations, and other logging rules may be conducted by module 66.

History and logging module 66 may keep track of, log, or otherwise record transactions, such as, for example, cost information received by monitor module 52, input information provided to rules engine 56, user responses to alert messages, latency values associated with effectuating a transfer from one public computing resource to another upon a determination being made to do such a transfer, another transaction and information related to transferring a workload from one public computing system to another public computing system. History and logging information may be provided from history and logging module 66 to artificial intelligence module 68. Artificial intelligence module 68 may use information received from history and logging module 66 to revise a learning model that may automatically revise rules and criteria of rules engine 56 without further human intervention or without input received at rules engine 56 from user interface module 54. Storage 70, which may comprise a database, may keep track of overall operation of system 50, or module 51, and may comprise history and logging information generated by history and logging module 66, criteria in transactions related thereto received by rules engine module 56 from user interface 54, cost information received at monitor module 52 and provided to rules engine 56 or execution engine 58, or information related to migration, or transfer, of a workload, such as, for example, latency, time of day, time of week. Storage 70 may comprise relational and NoSQL database management systems, and provide atomicity, consistency, isolation, and durability ("ACID") assurances. Storage 70 may maintain state information of the execution of system 51 with respect to transferring a workload from one public computing system to another, as well as provide failover, disaster recovery, and business continuity functionality.

Figure 5:
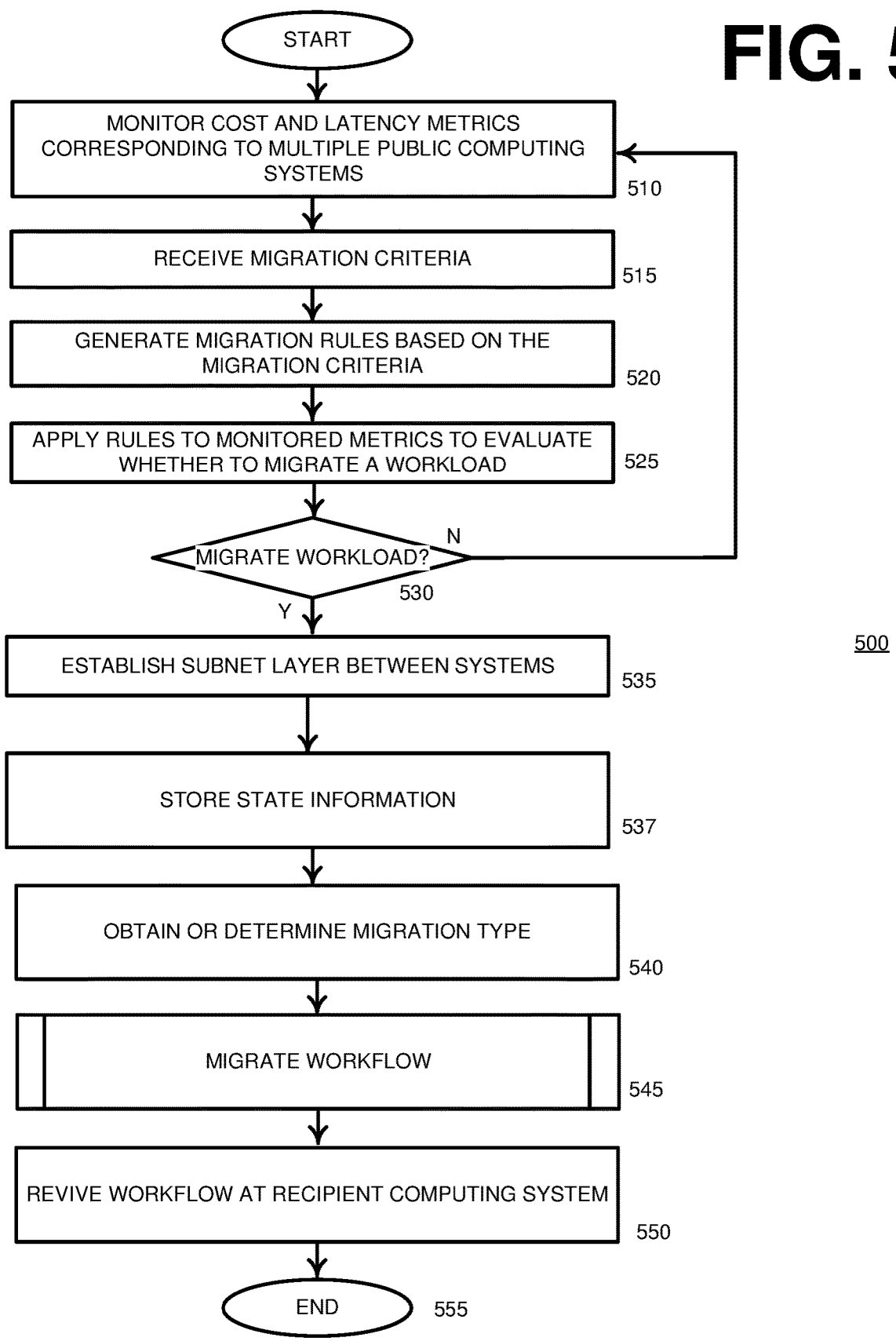
FIG. 5 illustrates a flow diagram of an example method to migrate a workload from a public computing system to a different public computing system.

Turning now to FIG. 5, the figure illustrates a flow diagram of an embodiment method 500 to migrate a workload from a first public computing system to a second public computing system. Method 500 begins at step 505. At step 510 a module monitors cost metrics received from multiple computing systems. The cost metrics may correspond to pricing for computer resources offered by one or more public computing service providers. In addition, costs metrics may include pricing for use of public computing resources that have been sold by the operator of the public computing resources and are being resold. At step 515 migration criteria may be received from a user interface module. For example, a user, such as an Information Technology ("IT") employee of an enterprise, may enter a criterion or criteria for when a workload that the enterprise is currently being facilitated by a public computing system should be migrated to a different public computing system. The criteria may be used to evaluate cost metrics received from one or more public computing systems or from a reseller market as described in reference to step 510. The criteria may also be used to evaluate latency relative to the public computing system that is currently being used to run the workload and a latency of another public computing system to which the workload may be migrated. The criteria may also be used to evaluate information relative to a transition period that may be associated with migrating the workload from the currently used public computing system to a different public computing system.

At step 520 migration rules are generated based on the migration criteria. At step 525 the rules that are based on the migration criteria received at step 515 are applied to the metrics monitored at step 510 to evaluate whether to migrate the workload from a public computing system currently being used to run the workload or to a different public computing system. At step 530, if a result of the evaluation made it step 525 is that the workload is not to be migrated method 500 returns to step 510 and metrics continued to be monitored.

If, however, a determination is made at step 530 that a result of the evaluation performed at step 525 is that the workload should be migrated from a public computing system that is currently being used to operate the workload to a different public computing system, method 500 advances to step 535. At step 535 a subnet layer connection may be established between the public computing system that is currently being used to operate the workload and a different public computing system to which the workload is to be migrated based on the evaluation made at step 525.

At step 537 state information corresponding to the workload may be stored to a remote storage that may be operated at a data center that is geographically located proximate to the public computing system that is currently being used to operate the workload or proximate a public computing system to which the workload is to be migrated. Although the remote storage may be located graphically close to the current, donor, public computing system or geographically close to the recipient computing system the remote storage may nevertheless be a separate storage and may be operated by a different service provider then a service provider of the donor computing system or the recipient computing system. In an embodiment, the state information that may be stored to the remote storage may comprise state information corresponding to the workload such that if a new virtual machine that is to continue the workload at the recipient computing system is to be established the state information may be used to revive the new workload virtual machine at the recipient computing system. In an embodiment, the state information that may be stored to the remote storage may comprise an image, or snapshot, of the current workload as it existed at the time performing step 537 such that instead of beginning a new virtual machine and then reviving the workload by applying stored state information to the new virtual machine, an image of the workload, which may include an application and its associated executable code, parameters, data, coefficients, algorithms, factors, and other aspects of the workload may be used to revive the workload at the recipient public computing system when the public computing system retrieves the image of the workload that is stored at step 537.

At step 540 a migration type, which may also be based on the evaluation performed at step 525, may be retrieved. At step 545 the workload may be migrated according to the migration type and according to a determination at step 525 of a public computing system to which the workload is to be migrated. A more detailed discussion of the migrating of the workload is provided in reference to FIG. 6. At step 550 the workload is revived as described above in reference to step 537 and is further described in reference to FIG. 6. Method 500 ends at step 555.

Figure 6:
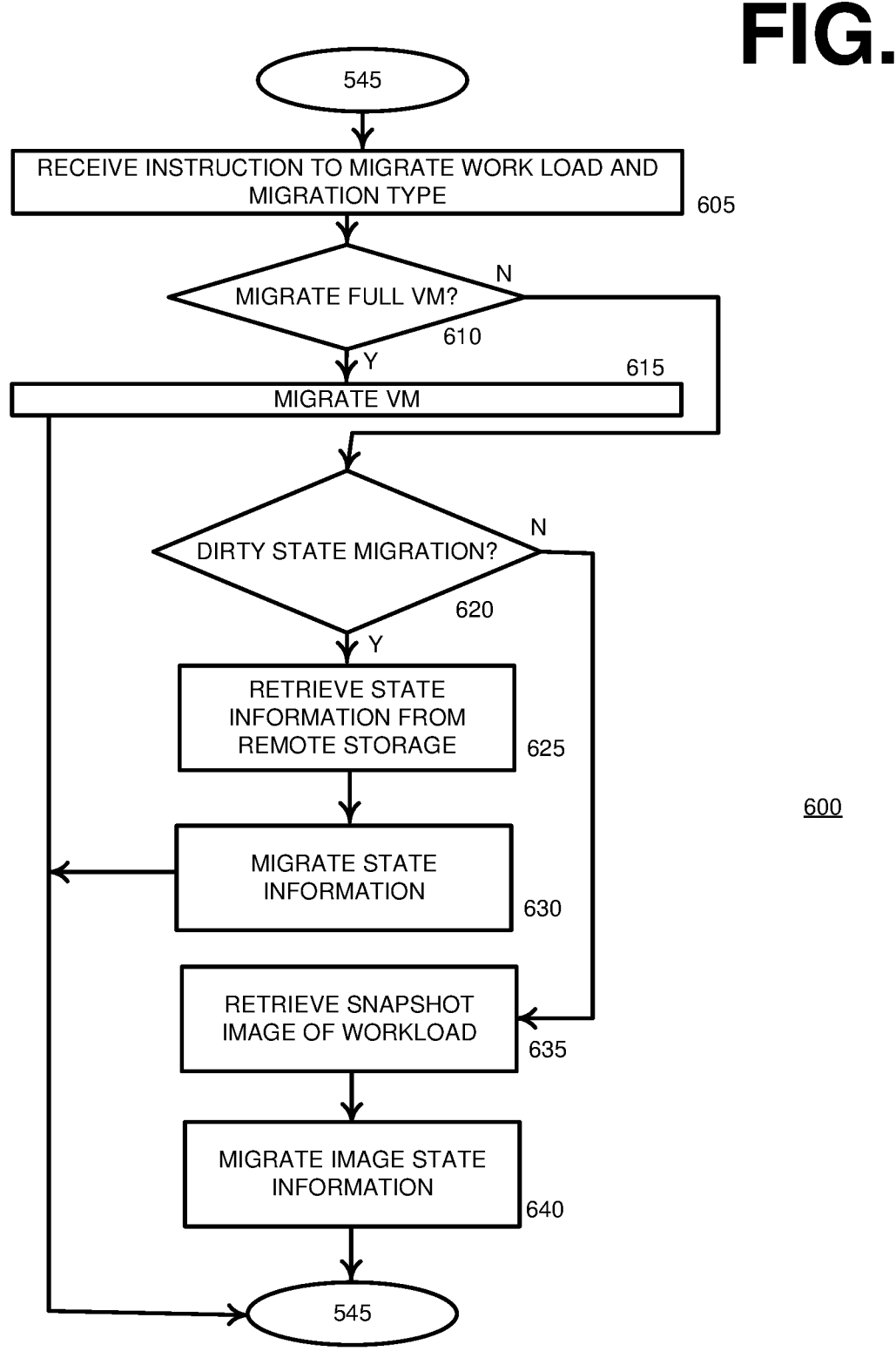
FIG. 6 illustrates a flow diagram of an example method to facilitate performing different types of migration of a workload from a public computing system to a different public computing system.

Turning now to FIG. 6, the figure illustrates a flow diagram of an embodiment method 545 to migrate a workload from a donor computing system to a recipient computing system, and to revive the workload at the recipient computing system. Method 545 begins at step 545 as described in reference to FIG. 5. At step 605 method 545 an execution module receives an instruction to migrate a workload from the donor computing system to the recipient computing system. The execution module may also receive a migration type, which may be to transfer the workload directly via a subnet layer between the donor computing system and the recipient computing system. The migration type may be a 'dirty state' transfer in which state information relative to the workload to be migrated has been stored to a remote storage but where a new virtual machine starts at the recipient computing system and is revived using the state information that is retrieved by the recipient computing system from the remote storage. The migration type may be an image migration where a snapshot is taken of the workload at the donor computing system before the migration begins and is stored to remote storage and then the recipient computing system retrieves the snapshot image of the workload and revives the workload based on the retrieved workload image.

At step 610 the execution module determines whether the migration type is to be a migration of a full virtual machine directly from the donor computing system to the recipient computing system. If the determination at step 610 is that a full VM migration is to be made, the workload is directly transferred via a subnet layer from the donor computing system to the recipient computing system in method 545 returns to step 545 as shown and described in reference to FIG. 5.

If a determination made it step 610 is that a full virtual machine migration is not to be made method 545 advances to step 620. At step 620 a determination is made whether a partial, or dirty state, migration is to be made. If a determination made at step 620 is that a dirty state migration is to be made method 545 advances to step 625. At step 625 the recipient computing system is instructed to retrieve from a remote storage state information corresponding to the workload that was stored at step 537 as described in reference to FIG. 5. At step 630 the recipient computing system may be instructed to begin a new virtual machine, retrieve dirty state information from the remote storage and revive the workload by executing the new virtual machine using the dirty state information retrieved from the remote storage. After step 630 method 545 returns to step 545 as described in reference to FIG. 5.

If a determination made at step 620 is that a dirty state migration is not to be made, method 545 advances to step 635. At step 635 the recipient computing system is instructed to read an image of the workload to be migrated from a remote storage. At step 640 the recipient computing system is instructed to revive the workload by running the workload based on the workload image retrieved at step 635 and method 545 returns to step 545 as described in reference to FIG. 5. A migration type, or a migration type instruction, may be determined manually by a user using interface 54, or a migration type may be determined automatically based complexity of a workload, how many connections or resources it may have to, or share with, other workloads, instances, application, processors, virtual machines, storage, and the like. If a workload is relatively simple with few external connections or interactions a determination may be made to perform a direct migration. For a complex workload with more connections a determination may be made that a migration type is to be a dirty state migration. A system such as system 50, or a module, such as module 52 may determine a given migration type according to information and data acquired from monitoring the current workload and interconnections therewith.

Figure 7:
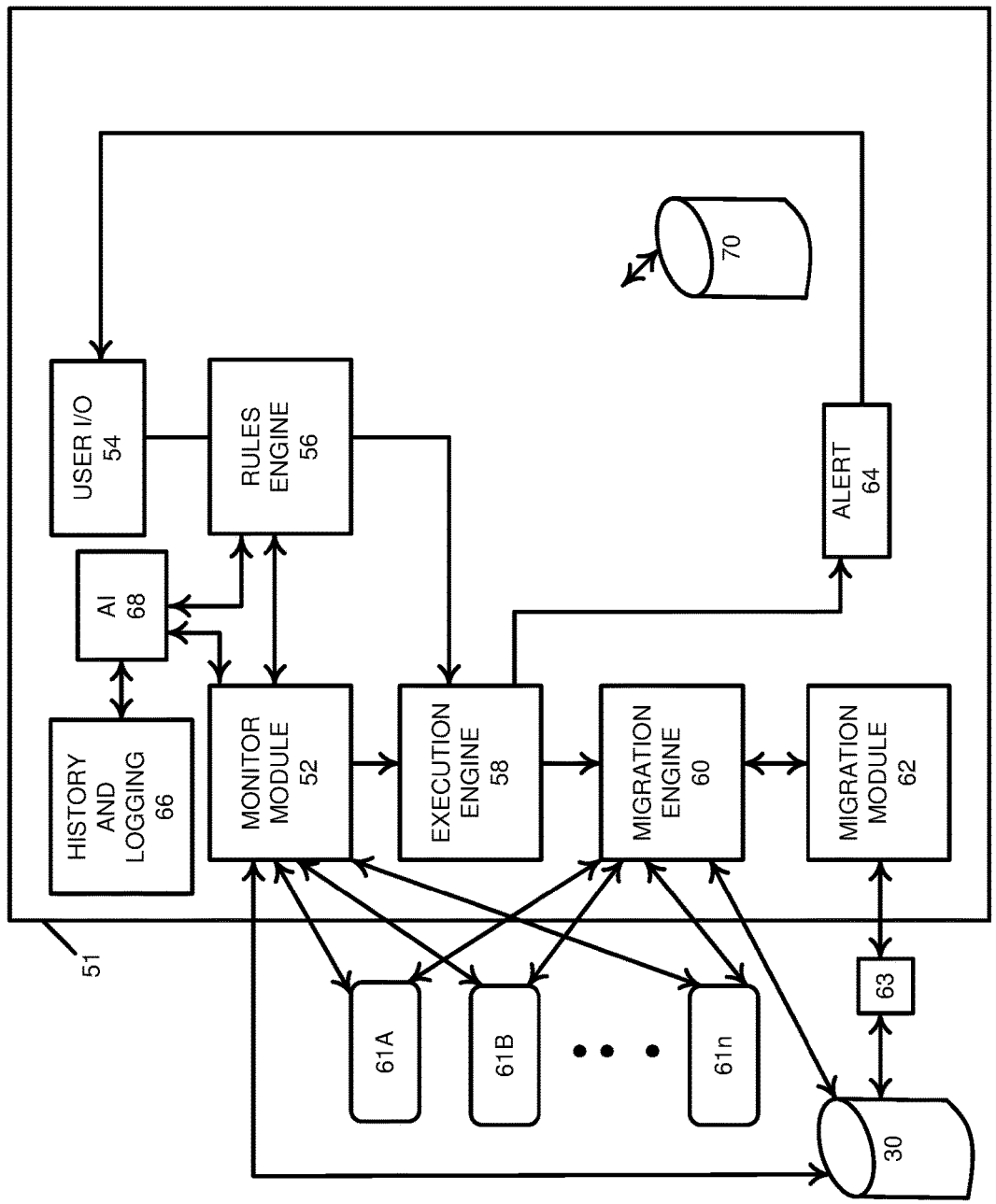
FIG. 7 illustrates an embodiment system having a learning model module to facilitate determining a migration criterion for use in migrating a computing workload from a public computing system to a different public computing system.

Turning now to FIG. 7, the figure illustrates an embodiment using a learning model to facilitate migrating a computing workload. Description of components shown in FIG. 7 may perform similar functions as components referred to by the same reference number as in the description above of FIG. 4. Artificial intelligent module 68 shown in FIG. 7 may comprise a learning model. The learning model of module 68 may comprise a neural network, an unsupervised model, a supervised, model, and another type of learning model. Module 68 may comprise multiple learning models that correspond to multiple computing workloads that may be operating on, executing on, or hosted by, public computing resource service providers that correspond to service provider interface modules 61A-61n.

Monitoring module 52 may monitor one or more service providers via interfaces 61A-61n. Monitor module 52 may forward monitored metric information or values to a learning model of module 68. The learning model may determine coefficients, factors, values, or variables to be provided to rules engine 56 based on the monitored metrics. Thus, instead of rules engine 56 applying a static criterion, or criteria, to monitored information monitored by module 52, the learning model may be trained and refined using training data, or by using actual, real-time, dynamic data or information that may be determined during commercial operation of system 50.

The learning model may begin as an initial learning model that may be trained using data from a training corpus. The training corpus may comprise generic data to provide default factors, coefficients, expressions, values, and other variables. The training corpus may comprise data from history and logging module 66, which data may comprise archived monitored data from providers monitored via interfaced 61A-61n, or which may comprise archived decisions to migrate a workload, or workloads, and corresponding user input instructions corresponding to recommendations to migrate a workload received via user I/O module 54.

In an embodiment, a learning model may generate a recommendation to migrate a computing workload based on data from services providers monitored via interfaces 61A-61n. Manual user inputs from user I/O module 54 to accept, or reject, a recommendation generated by the learning model may be provided as feedback to train a learning model of module 68. Real time data monitored via interfaces 61A-61n may be used only during training of a learning model or may be used during commercial operation of system 50 to train/refine the learning model of module 68, which may be used to determine, or refine, criterion, or criteria, of rules engine 56. It will be appreciated that although various components of system 50 may be described as discrete components, or modules, one or more of the modules may be combined with one or more other modules. For example, rules engine 56 may be part of module 68, part of a learning module thereof, or may be a separate module of module 68.

Figure 8:
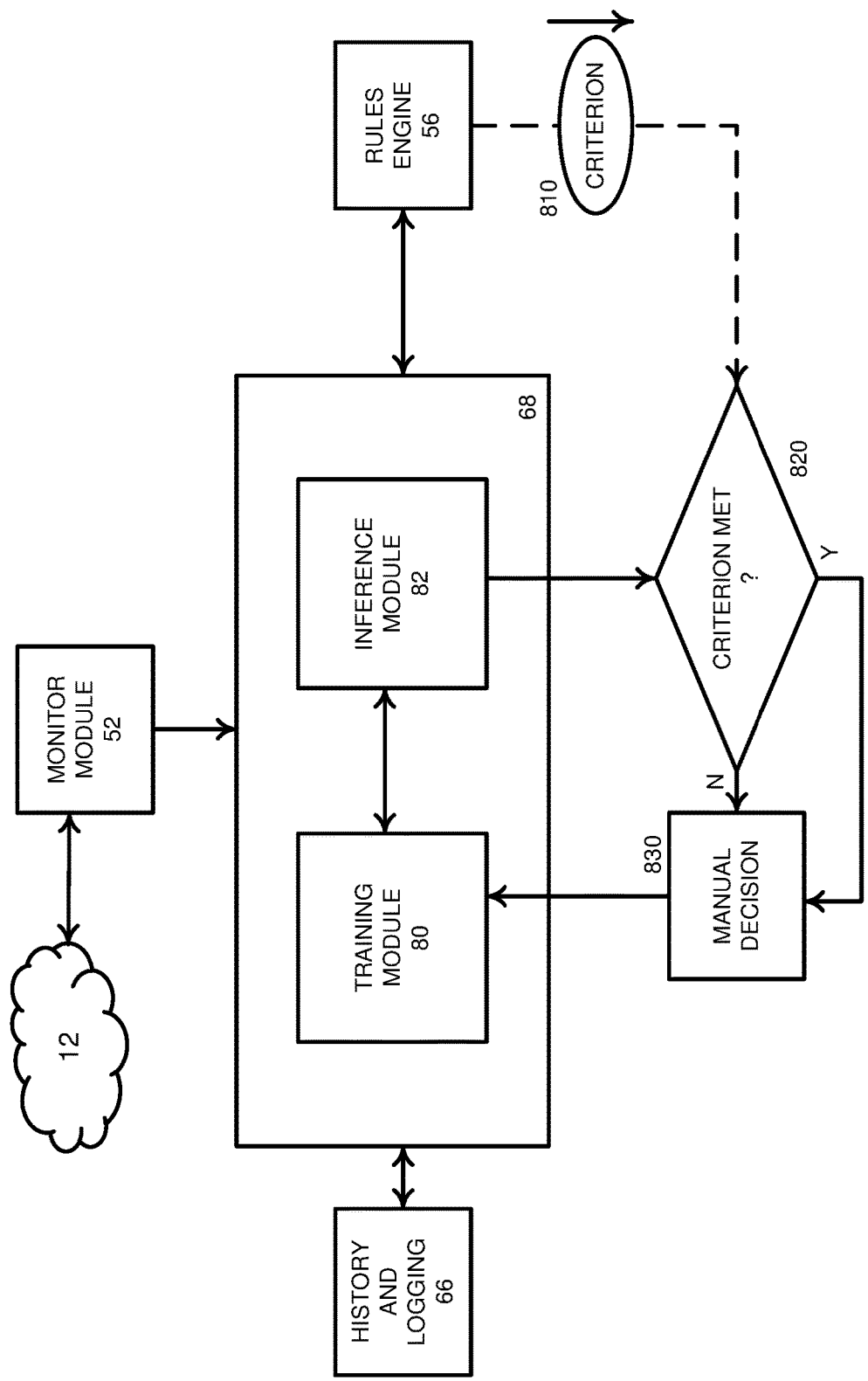
FIG. 8 illustrates an embodiment to train a learning model module.

Turning now to FIG. 8, the figure illustrates module 68 comprising a training module 80 and inference module 82. Modules 80 and 82 are shown as separate blocks of a learning model to facilitate illustration and description, but may be part of the same module, or learning model. Module 52 may monitor computing metrics from network 12, for example, computing metrics corresponding to service providers via interfaces 61A-61n shown in FIG. 7. It will be appreciated that one module 68 is shown for purposes of illustration and description but that multiple workloads that may be managed by a user, or entity, for example an entity that uses public computing resources for running, hosting, or otherwise facilitating computing workloads may be associated with, or correspond to, different modules 68 that may be individually and separately trained to manage, and may manage, the workloads.

Rules engine 56 may comprise a criterion, or criteria, to be used in analyzing computing metric data monitored by monitor module 52 to determine whether to migrate a computing workload from one computing system that may be coupled to network 12 to another computing system that may be coupled to network 12. Criterion 810 may comprise configured, or static, a criterion, or criteria, that may have been manually configured, or previously configured. The configuration of criterion/criteria 810 may have been entered manually by a user, or administrator, of an entity that may be using a workload running on a computing system coupled to network 12 that may be subject to migration. The configuration of criterion/criteria 810 may be updated, revised, or otherwise trained as may be described elsewhere herein.

Criterion/criteria 810, which may comprise a migration criterion, or criteria, may be provided to a learning model of module 68 to be used to automatically determine whether to migrate a workload from one computing system to another. Configure criterion 810 may be based on information or data received from history and logging module 66. Information or data from history and logging module 66 may comprise a compilation of previous migrations of workloads and corresponding metrics that may have been monitored by module 52 that resulted in the migrations.

After configuration of criterion or criteria 810, a learning model of module 68 may be updated with revised criterion or criteria—such revising or updating may be referred to as training of a learning model of module 68. Training may comprise a learning model producing a recommendation to migrate a workload from a first computing system to a second computing system based on information or data or metrics monitored by module 52, wherein the monitored information, data, or metrics correspond to the first computing system or the second computing system. A recommendation made by module 68 may be determined at block 820 wherein monitored metrics may be analyzed with respect to current migration criteria. A manual decision, by an administrator or other personnel associated with a workload recommended for migration, may be made at block 830 whether to accept or reject the recommendation made by module 68 at block 820. The recommendation may be a recommendation to migrate a workload, or a recommendation made by module 68 may be not to migrate a workload. Thus, the 'yes' and 'no' outputs from block 820 both feed into block 830 as inputs. Even if a recommendation made at block 820 is to not migrate a workload an administrator or other personnel may nevertheless override the recommendation and decide to migrate the workload anyway. Conversely if a recommendation is made at block 820 to migrate a workload an administrator or other personnel may decide not to migrate the workload at block 830. If a recommendation at block 820 is to migrate a workload a personnel may choose to accept the recommendation and authorize, or otherwise select, migration of the workload from the first computing system to the second computing system, or if a recommendation made at block 820 is to not migrate a workload the personnel may choose, to accept the recommendation and not migrate the workload from the first computing system to the second computing system. Accordingly training module 80 may be updated and thus criterion 810 which may be provided to rules engine 56 may be determined based on manual responses, acceptances, or rejections, of recommendations made by module 68 at block 820. Therefore, a learning model of module 68 may become trained based on manual user input in response to recommendations whether to migrate or not to migrate a workload. It will be appreciated that such training may occur, be performed, or otherwise carried out during a training period during which only training data from a training corpus are used for analysis with respect to migration criteria. Training corpus data may be based on data or information retrieved from history and logging module 66. In an embodiment live, commercial operation, of a system that includes module 68 may be ongoing during the training period. For example, a live workload may be operating on a first computing system and a recommendation may be made at block 820 based on a criterion 810 to migrate the workload to a second computing system. An administrator may accept the recommendation at block 830 thus approving, authorizing, or otherwise determining to move the workload from the first computing system to the second computing system and thus a learning model of module 68 may be trained, or refined, during commercial operation of a system that comprises module 68, for example system 50 shown in FIG. 7.

Figure 9:
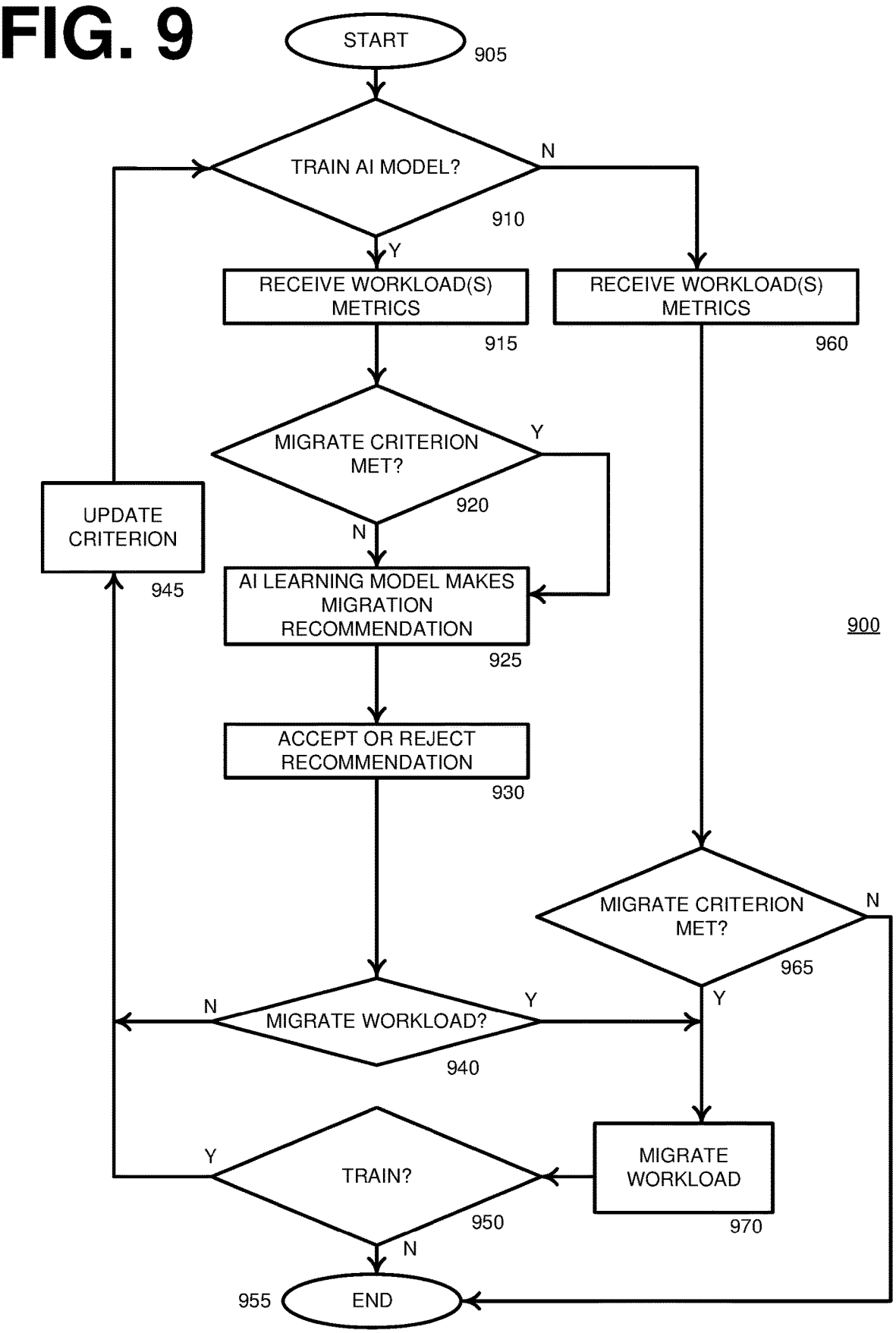
FIG. 9 illustrates a flow diagram of a method embodiment of training or using a learning model to migrate a computing workload.

Turning now to FIG. 9, the figure illustrates a flow diagram of an example embodiment method 900, which may comprise actions facilitated by software running on, executed by, or otherwise corresponding to system 50, for example, shown in FIG. 7. Continuing with description of FIG. 9, method 900 begins at act 905. At act 910 a determination is made whether to train an artificial intelligence learning model, which may be used to determine whether to migrate a workload from one computing system to another, and which may correspond to a given workload. If the determination made at act 910 is that a learning model, for example a learning model that may be part of module 68 shown in FIG. 7 and FIG. 8, is not to be trained, method 900 advances to act 960. At act 960 a processor of a computing system on which a system, such as system 50 shown in FIG. 7 may be executing, may receive metrics, data, or other information related to a workload, or workloads, running on a public cloud computing system. The metrics may correspond to a first computing system on which the workload, or workloads, are running and may also comprise information or data from one or more second, third, or fourth, etc., other computing systems that may be candidates for receiving a migration of the one or more of the workloads. At act 965 a determination is made by the processor to migrate the workload, or workloads, based on whether respective migration criteria corresponding to the one or more workloads are satisfied. If a workload migration criterion, or criteria, is not met at 965 a workload corresponding to the analyzed metrics and criterion/criteria is not migrated and remains operational on the computing system on which it is currently executing. Method 900 advances from act 965 to act 955 and ends.

Returning to description of act 965 if a determination made is that metrics received at act 960 and analyzed with respect to migration criterion/criteria corresponding to the one or more workloads satisfies the migration criterion, or criteria, the workload, or workloads, are migrated at act 970 from a computing system, or systems, on which they may be operating to one or more different computing systems. At act 950 a determination is made whether the determination made at act 965 and corresponding analysis of inputs made thereto are to be used as training data to update a learning model, for example a learning model of module 68 as shown in FIG. 7. If a determination made at act 950 is that the determination made at act 965 and analysis related to the migration performed at act 970 are not to be used as training data method 900 advances to act 955 and ends.

However, if a determination made at act 950 is that the migration determination made it act 965 and information related to the corresponding migration(s) performed at act 970 are to be used to train a learning model module, 900 advances to act 945. At act 945 criterion/criteria, which may be criterion/criteria 810 as described in reference to FIG. 8, may be updated based on the migration determination made at act 965, analysis related thereto, and the migration made at act 970, and method 900 returns to act 910.

Returning to description of act 910, if a determination is made that a learning model is to be trained, information, data, or metrics corresponding to one or more computing systems and one or more workloads, which may be referred to as one or more training workloads, running on the computing systems may be received at act 915 by a processor of a system, for example system 50 shown in FIG. 7. At act 920 a determination is made whether metrics monitored and received at act 915 satisfy migration criterion/criteria. It will be appreciated that analysis performed at act 920 may be similar to analysis performed at act 965 insofar as metrics or other information that may be received at 915 may be similar to metrics or other information received at act 960 and analyzed at act 965. If a determination made at act 920 is that migration criterion, or criteria, are satisfied, such that a migration of a training workload should be made, method 900 advances to act 925. If analysis made at act 920 is that a criterion, or criteria, is not satisfied such that a migration of a migration workload is not to occur, method 900 also advances to act 925. A diamond-shaped decision box is used to represents act 920 to show that a decision whether to migrate a training workload is made at act 920 but that regardless of the decision made at act 920, whether yes or no, the output of the migration decision is an input to act 925.

At act 925 a processor, for example a processor of a computing system that may be running on or hosted by system 50 as shown in FIG. 7 or FIG. 8, may be configured to make a recommendation to migrate or not to migrate a training workload, or training workloads, based on a determination made at act 920. A recommendation made at act 925 may be a textual recommendation, a visual recommendation, such as, for example a green or a red symbol displayed on a display corresponding to, or provided via, for example, user input output module 54 shown in reference to FIG. 7, or another type indication or control item (e.g., a dialog box, a text box, a drop down box, etc.) that provides for receiving a response from a user. At act 930 the processor may receive an acceptance or a rejection of the recommendation made at act 925. The acceptance or rejection of the recommendation may be made via a user input and via I/O module shown in FIG. 7, for example, by an administrator or other user associated with a workload, or workloads, for which recommendation(s) to migrate (or not) may have been made at act 920. It will be appreciated that an acceptance or a rejection at act 930 of a recommendation made at act 920 may comprise a manual user input made via an input/output module or an acceptance or rejection may comprise an automatic determination made according to an acceptance function, that may be configured or that may be updated at act 945.

In addition to training a learning model using metrics corresponding to a training workload, a corresponding migration recommendation, and an acceptance/rejection thereof, if one or more of the training workloads is currently commercially operational (e.g., even though referred to as a training workload herein, the training workload may be deployed in commercial service on public cloud computing system), the one or more training workloads may be actually migrated from one commercial cloud computing system to another based on a migration recommendation and a corresponding acceptance or rejection of the recommendation. If a recommendation made at act 920 to migrate a training workload is accepted at act 930, or if a recommendation made at act 920 to not migrate a training workload is rejected at act 930, a determination may be made at act 940 based on the recommendation and acceptance or rejection thereof, to migrate the training workload, method 900 may advance to act 970, and the training workload, or workloads, may be migrated. It will be appreciated that if a determination made at act 940 is to migrate a training workload, because act 940 was arrived at due to a determination being made at act 910 to train a learning model a determination at act 950 may be automatically made to follow the 'Y' path from act 950 and to update a migration criterion, or criteria, of the learning model at act 945. Conversely, if act 970 is reached via act 960 and act 965 due to a determination being made at act 910 not to train the learning model, a determination made at act 950 may be to follow the 'N' path to act 955.

Returning to description of act 940, if a recommendation made at act 920 to migrate a training workload is rejected at act 930, or if a recommendation made at act 920 to not migrate a training workload is accepted at act 930, a determination may be made at act 940 to not migrate the training workload, and method 900 advances to act 945 and a migration criterion, or criteria, are updated. Thus, an acceptance or a rejection of a migration recommendation made at act 925 may be used to train an artificial intelligence learning model, such as a model that may be part of module 68 shown in FIG. 7 or FIG. 8. It will be appreciated that automatic determinations to migrate, or not, workloads may occur at act 940 according to a trained learning model if recommendations made at act 925 have been accepted, either manually or automatically, at act 930 more times than a determined automatic migration criterion, or threshold, which may comprise a configured value, or a statistically determined value.

Figure 10:
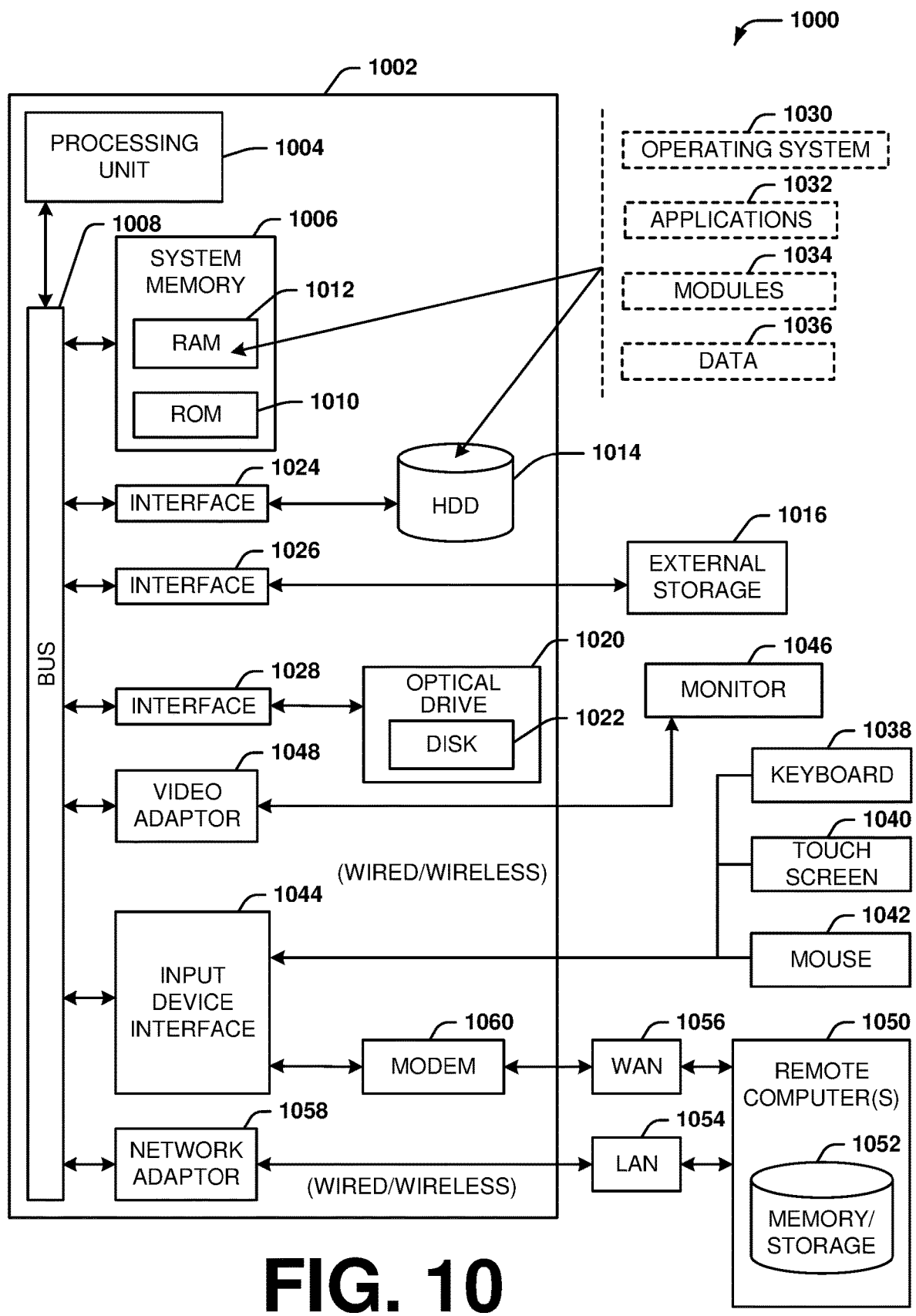
FIG. 10 illustrates a computer environment.

In order to provide additional context for various embodiments described herein, FIG. 10 and the following discussion are intended to provide a brief, general description of a suitable computing environment 1000 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

Computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, stand-alone, executable packages of software that include, e.g., code, runtime, system tools, system libraries and settings for an application.

Further, computer 1002 can comprise a security module, such as a trusted processing module (TPM). For instance, with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
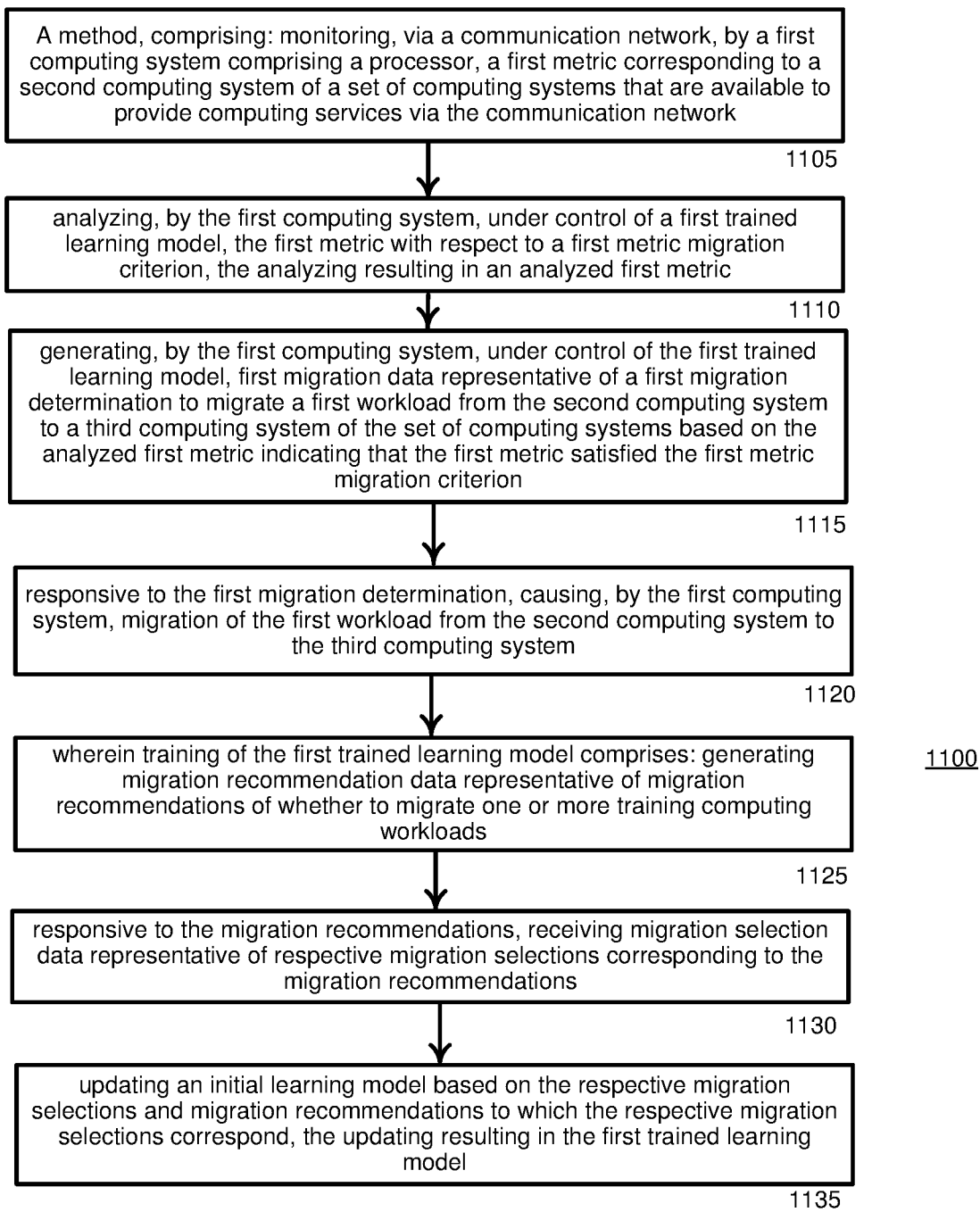
FIG. 11 illustrates a block diagram of an example method.

Turning now to FIG. 11, the figure illustrates an example method 1100 comprising at block 1105 monitoring, via a communication network, by a first computing system comprising a processor, a first metric corresponding to a second computing system of a set of computing systems that are available to provide computing services via the communication network; at block 1110 analyzing, by the first computing system, under control of a first trained learning model, the first metric with respect to a first metric migration criterion, the analyzing resulting in an analyzed first metric; at block 1115 generating, by the first computing system, under control of the first trained learning model, first migration data representative of a first migration determination to migrate a first workload from the second computing system to a third computing system of the set of computing systems based on the analyzed first metric indicating that the first metric satisfied the first metric migration criterion; at block 1120 responsive to the first migration determination, causing, by the first computing system, migration of the first workload from the second computing system to the third computing system; at block 1125 wherein training of the first trained learning model comprises: generating migration recommendation data representative of migration recommendations of whether to migrate one or more training computing workloads; at block 1130 responsive to the migration recommendations, receiving migration selection data representative of respective migration selections corresponding to the migration recommendations; and at block 1135 updating an initial learning model based on the respective migration selections and migration recommendations to which the respective migration selections correspond, the updating resulting in the first trained learning model.

Figure 12:
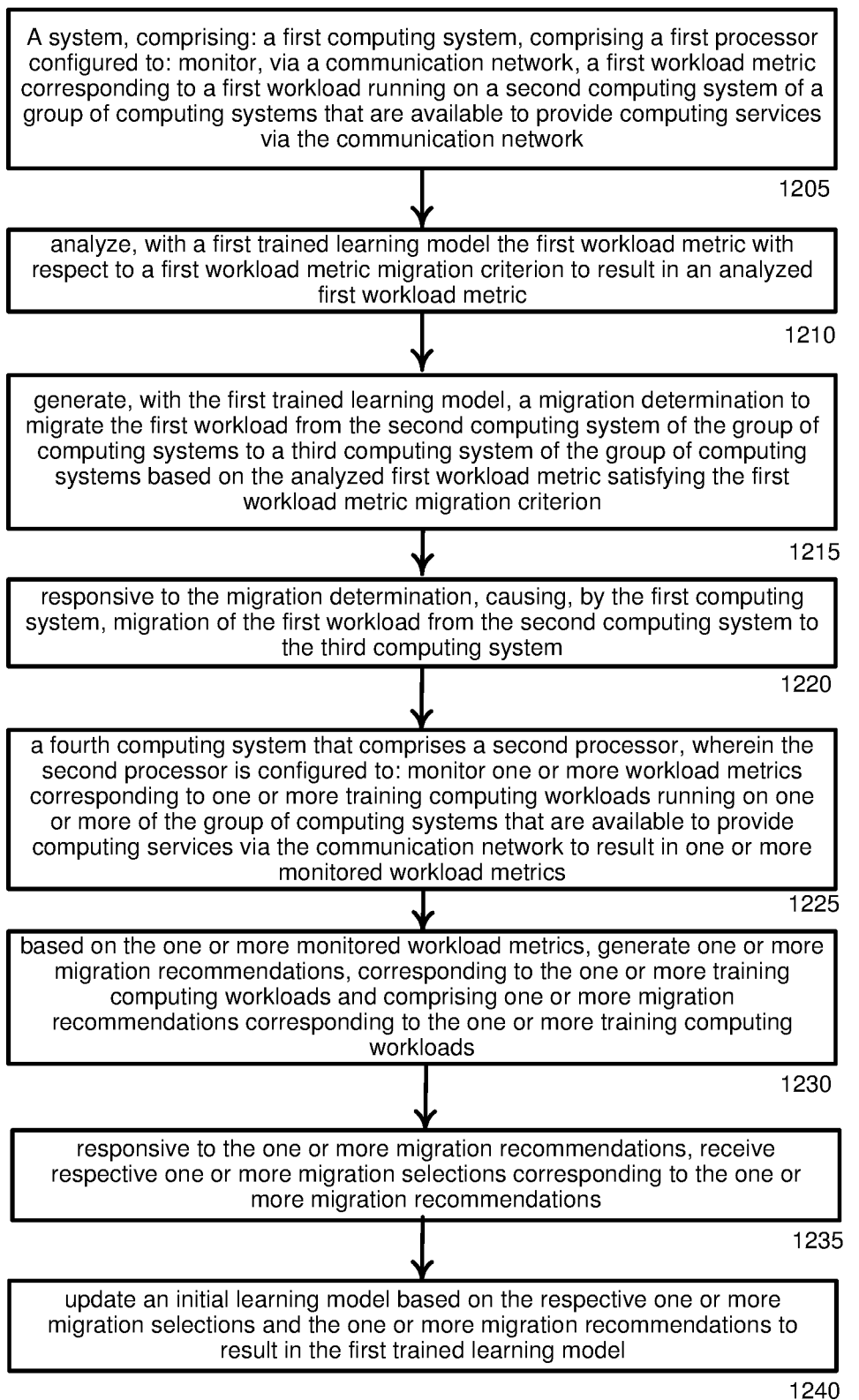
FIG. 12 illustrates a block diagram of an example system.

Turning now to FIG. 12, the figure illustrates am example system 1200, comprising at block 1205 a first computing system, comprising a first processor configured to: monitor, via a communication network, a first workload metric corresponding to a first workload running on a second computing system of a group of computing systems that are available to provide computing services via the communication network; at block 1210 analyze, with a first trained learning model the first workload metric with respect to a first workload metric migration criterion to result in an analyzed first workload metric; at block 1215 generate, with the first trained learning model, a migration determination to migrate the first workload from the second computing system of the group of computing systems to a third computing system of the group of computing systems based on the analyzed first workload metric satisfying the first workload metric migration criterion; at block 1220 responsive to the migration determination, causing, by the first computing system, migration of the first workload from the second computing system to the third computing system; at block 1225 a fourth computing system that comprises a second processor, wherein the second processor is configured to: monitor one or more workload metrics corresponding to one or more training computing workloads running on one or more of the group of computing systems that are available to provide computing services via the communication network to result in one or more monitored workload metrics; at block 1230 based on the one or more monitored workload metrics, generate one or more migration recommendations, corresponding to the one or more training computing workloads and comprising one or more migration recommendations corresponding to the one or more training computing workloads; at block 1235 responsive to the one or more migration recommendations, receive respective one or more migration selections corresponding to the one or more migration recommendations; and at block 1240 update an initial learning model based on the respective one or more migration selections and the one or more migration recommendations to result in the first trained learning model.

Figure 13:
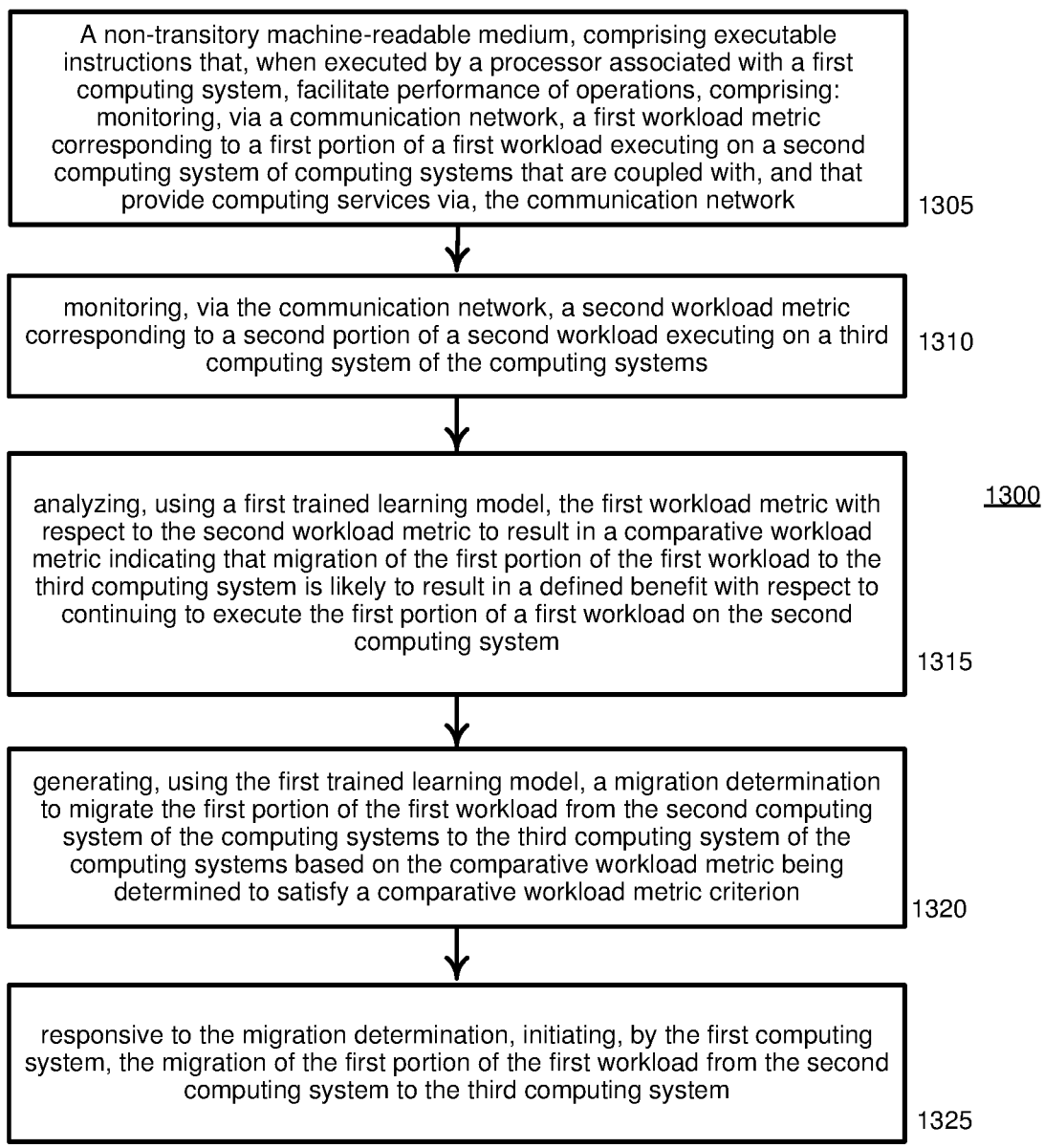
FIG. 13 illustrates a block diagram of an example non-transitory machine-readable medium.

Turning now to FIG. 13, the figure illustrates a method 1300 comprising at block 1305 a non-transitory machine-readable medium, comprising executable instructions that, when executed by a processor associated with a first computing system, facilitate performance of operations, comprising: monitoring, via a communication network, a first workload metric corresponding to a first portion of a first workload executing on a second computing system of computing systems that are coupled with, and that provide computing services via, the communication network; at block 1310 monitoring, via the communication network, a second workload metric corresponding to a second portion of a second workload executing on a third computing system of the computing systems; at block 1315 analyzing, using a first trained learning model, the first workload metric with respect to the second workload metric to result in a comparative workload metric indicating that migration of the first portion of the first workload to the third computing system is likely to result in a defined benefit with respect to continuing to execute the first portion of a first workload on the second computing system; at block 1320 generating, using the first trained learning model, a migration determination to migrate the first portion of the first workload from the second computing system of the computing systems to the third computing system of the computing systems based on the comparative workload metric being determined to satisfy a comparative workload metric criterion; at block 1325 responsive to the migration determination, initiating, by the first computing system, the migration of the first portion of the first workload from the second computing system to the third computing system.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form. The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
monitoring, via a communication network, by a first computing system comprising a processor, a first metric corresponding to a second computing system of a set of computing systems that are available to provide computing services via the communication network;
analyzing, by the first computing system, under control of a first trained learning model, the first metric with respect to a first metric migration criterion, the analyzing resulting in an analyzed first metric;
generating, by the first computing system, under control of the first trained learning model, first migration data representative of a first migration determination to migrate a first workload from the second computing system to a third computing system of the set of computing systems based on the analyzed first metric indicating that the first metric satisfied the first metric migration criterion; and
responsive to the first migration determination, causing, by the first computing system, migration of the first workload from the second computing system to the third computing system, wherein the second computing system and the third computing system are different computing systems.

2. The method of claim 1, further comprising:
monitoring, via the communication network, a second metric corresponding to the third computing system of the set of computing systems, wherein the first metric migration criterion is evaluated based at least in part on the second metric.

3. The method of claim 1, wherein training of the first trained learning 3. model comprises:
generating migration recommendation data representative of migration recommendations of whether to migrate one or more training computing workloads;
responsive to the migration recommendations, receiving migration selection data representative of respective migration selections corresponding to the migration recommendations; and
updating an initial learning model based on the respective migration selections and migration recommendations to which the respective migration selections correspond, the updating resulting in the first trained learning model.

4. The method of claim 3, wherein at least one of the migration selections comprises an instruction to migrate at least one of the one or more training computing workloads, wherein the training of the first trained learning model further comprises:
analyzing a first migration selection of the migration selections with respect to a first migration recommendation of the migration recommendations according to a migration recommendation acceptance function, the analyzing of the first migration selection resulting in a first determined migration recommendation acceptance;
analyzing a second migration selection of the migration selections with respect to a second migration recommendation of the migration recommendations according to the migration recommendation acceptance function, the analyzing of the second migration selection resulting in a second determined migration recommendation acceptance; and
updating the first metric migration criterion based on the first determined migration recommendation acceptance or the second determined migration recommendation acceptance.

5. The method of claim 4, wherein at least one of the first determined migration recommendation acceptance or the second determined migration recommendation acceptance is manually configured.

6. The method of claim 3, wherein at least one of the migration selections comprises an instruction for at least one workload, of the one or more training computing workloads, to remain on a computing system via which the at least one workload is currently executing, wherein the training of the first trained learning model further comprises:
analyzing a first migration selection of the migration selections according to a migration recommendation acceptance function with respect to a first migration recommendation of the migration recommendations corresponding to the first migration selection, the analyzing of the first migration selection resulting in a first determined migration recommendation acceptance;
analyzing a second migration selection of the migration selections according to a migration recommendation acceptance function with respect to a second migration recommendation of the migration recommendations corresponding to the second migration selection, the analyzing of the second migration selection resulting in a second determined migration recommendation acceptance; and
updating the first metric migration criterion based on at least one of the first determined migration recommendation acceptance or the second determined migration recommendation acceptance.

7. The method of claim 3, wherein the initial learning model is configured with factors of a static migration rules engine.

8. The method of claim 3, wherein the respective migration selections corresponding to the migration recommendations are manually input to the initial learning model or to the first trained learning model.

9. The method of claim 1, wherein the first workload, when executing via the second computing system, comprises instructions to access data from a data store corresponding to a fourth computing system communicatively coupled with the communication network, and wherein the first migration data representative of the first migration determination comprises instructions for the first workload to access the data from the data store after the first workload has been migrated to the third computing system.

10. The method of claim 1, wherein the first trained learning model corresponds to a first type of learning model for an instance of the first workload being a first type of workload, and wherein the first trained learning model corresponds to a second type of learning model for the instance of the first workload being a second type of workload.

11. The method of claim 1, further comprising:
monitoring, via the communication network, by the first computing system, a second metric corresponding to a fourth computing system of the set of computing systems;
analyzing, under control of a second trained learning model executing via the first computing system, the second metric with respect to a second metric migration criterion, the analyzing of the second metric resulting in an analyzed second metric;
generating, under control of the second trained learning model, second migration data representative of a second migration determination to migrate a second workload executing via the fourth computing system to a fifth computing system of the set of computing systems based on the analyzed second metric satisfying the second metric migration criterion; and
responsive to the second migration determination, causing, by the first computing system, migration of the second workload from the fifth computing system to the sixth computing system,
wherein the first trained learning model and the second trained learning model are different.

12. A system, comprising:
a first computing system, comprising a first processor configured to:
monitor, via a communication network, a first workload metric corresponding to a first workload running on a second computing system of a group of computing systems that are available to provide computing services via the communication network;
analyze, with a first trained learning model the first workload metric with respect to a first workload metric migration criterion to result in an analyzed first workload metric;
generate, with the first trained learning model, a migration determination to migrate the first workload from the second computing system of the group of computing systems to a third computing system of the group of computing systems based on the analyzed first workload metric satisfying the first workload metric migration criterion; and
responsive to the migration determination, causing, by the first computing system, migration of the first workload from the second computing system to the third computing system, wherein the second computing system and the third computing system are different computing systems.

13. The system of claim 12, wherein the first workload, when running on the second computing system comprises instructions to access data from a data store corresponding to a fourth computing system communicatively coupled with the communication network, and wherein the migration determination comprises instructions for the first workload to access the data from the data store after the first workload has been migrated to the third computing system.

14. The system of claim 12, further comprising a fourth computing system that comprises a second processor, wherein the second processor is configured to:
monitor one or more workload metrics corresponding to one or more training computing workloads running on one or more of the group of computing systems that are available to provide computing services via the communication network to result in one or more monitored workload metrics;
based on the one or more monitored workload metrics, generate one or more migration recommendations, corresponding to the one or more training computing workloads and comprising one or more migration recommendations corresponding to the one or more training computing workloads;
responsive to the one or more migration recommendations, receive respective one or more migration selections corresponding to the one or more migration recommendations; and
update an initial learning model based on the respective one or more migration selections and the one or more migration recommendations to result in the first trained learning model.

15. The system of claim 14, wherein the first computing system and the fourth computing system are different computing systems.

16. The system of claim 14, wherein at least one of the one or more migration selections comprises an instruction to migrate a workload, of the one or more training computing workloads, corresponding to the at least one of the one or more migration selections, wherein the training of the first trained learning model further comprises:
analyzing a first migration selection of the one or more migration selections with respect to a first migration recommendation of the one or more migration recommendations according to a migration recommendation acceptance function to result in a first determined migration recommendation acceptance;
analyzing a second migration selection of the one or more migration selections with respect to a second migration recommendation the one or more migration recommendations according to the migration recommendation acceptance function to result in a second determined migration recommendation acceptance; and
updating the first workload metric migration criterion based on the first determined migration recommendation acceptance or the second determined migration recommendation acceptance.

17. A non-transitory machine-readable medium, comprising executable instructions that, when executed by a processor associated with a first computing system, facilitate performance of operations, comprising:
monitoring, via a communication network, a first workload metric corresponding to a first portion of a first workload executing on a second computing system of computing systems that are coupled with, and that provide computing services via, the communication network;
monitoring, via the communication network, a second workload metric corresponding to a second portion of a second workload executing on a third computing system of the computing systems;
analyzing, using a first trained learning model, the first workload metric with respect to the second workload metric to result in a comparative workload metric indicating that migration of the first portion of the first workload to the third computing system is likely to result in a defined benefit with respect to continuing to execute the first portion of a first workload on the second computing system;

generating, using the first trained learning model, a migration determination to migrate the first portion of the first workload from the second computing system of the computing systems to the third computing system of the computing systems based on the comparative workload metric being determined to satisfy a comparative workload metric criterion; and responsive to the migration determination, initiating, by the first computing system, the migration of the first portion of the first workload from the second computing system to the third computing system, wherein the second computing system and the third computing system are different computing systems.

18. The non-transitory machine-readable medium of claim 17, the operations further comprising:

generating migration recommendations that recommend migration of training computing workload portions;

responsive to the migration recommendations, receiving respective migration selections corresponding to the migration recommendations;

updating an initial learning model based on the respective migration selections and the migration recommendations to which the respective migration selections to result in the first trained learning model, wherein at least one of the migration selections comprises a first instruction for the second portion of the second workload, of the training computing workload portions, corresponding to the at least one of the migration selections to remain on a computing system on which the second workload portion is currently executing, wherein at least another one of the migration selections, other than the at least one of the migration selections, comprises a second instruction to migrate a third portion of a third workload, of the training computing workload portions, from a computing system on which the third workload portion is currently executing;

analyzing a first migration selection of the migration selections according to a migration recommendation acceptance function with respect to a first migration recommendation corresponding to the first migration selection to result in a first determined migration recommendation acceptance;

analyzing a second migration selection of the migration selections according to a migration recommendation acceptance function with respect to a second migration recommendation corresponding to the second migration selection to result in a second determined migration recommendation acceptance; and updating the comparative workload metric criterion based on at least the first determined migration recommendation acceptance or the second determined migration recommendation acceptance.

19. The non-transitory machine-readable medium of claim 17, wherein the first workload metric or the second workload metric corresponds to at least one of: a disruption tolerance, a first cost of the first portion of the first workload executing on the second computing system, a second cost of the first portion of the first workload executing on the third computing system, a third cost of the first portion of the first workload per unit of time on premises, a percentage of time at peak, a virtual disk storage cost associated with the second computing system, a virtual disk storage cost associated with the third computing system, a fourth cost of a first virtual machine associated with the second computing system at a first point in time, a fifth cost of a second virtual machine associated with the third computing system at a second point in time, a sixth cost of a third virtual machine per storage unit of a virtual storage associated with the second computing system, a seventh cost of a fourth virtual machine per storage unit of a virtual storage associated with the third computing system, an eighth cost of a fifth virtual machine per storage unit of a virtual storage associated with the second computing system at a third point in time, a ninth cost of a sixth virtual machine per storage unit of a virtual storage associated with the third computing system at a fourth point in time, a tenth cost of bandwidth to migrate the first portion of the first workload from the second computing system to the third computing system, an eleventh cost to migrate the first portion of the first workload from the second computing system to the third computing system, a first workload mode of steady, or a second workload mode of variable.

20. The non-transitory machine-readable medium of claim 17, wherein the first portion of the first workload, when executing on the second computing system, comprises first instructions to access data from a storage communicatively coupled with the communication network, and wherein the migration determination comprises second instructions for the first portion of the first workload to access the data from the storage communicatively coupled with the communication network after the first portion of the first workload has been migrated to the third computing system.

* * * * *